(12) United States Patent
Rotter et al.

(10) Patent No.: US 9,254,619 B2
(45) Date of Patent: *Feb. 9, 2016

(54) METHOD AND APPARATUS FOR FABRICATING VARIABLE GAUGE, CONTOURED COMPOSITE STIFFENERS

(71) Applicant: The Boeing Company, Chicago, IL (US)

(72) Inventors: Daniel M. Rotter, Lake Forest, WA (US); Michael R. Chapman, Federal Way, WA (US); Brad A. Coxon, Everett, WA (US); Paul E. Nelson, University Place, WA (US); Khanh M. Pham, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/916,779

(22) Filed: Jun. 13, 2013

(65) Prior Publication Data

US 2013/0340928 A1 Dec. 26, 2013

Related U.S. Application Data

(63) Continuation-in-part of application No. 13/217,109, filed on Aug. 24, 2011, now Pat. No. 8,465,613.

(51) Int. Cl.
*B29C 51/10* (2006.01)
*B29D 99/00* (2010.01)
(Continued)

(52) U.S. Cl.
CPC .......... *B29D 99/0003* (2013.01); *B29C 70/462* (2013.01); *B29L 2031/001* (2013.01); *Y10T 156/1031* (2015.01)

(58) Field of Classification Search
CPC ................... B29L 2031/001; Y10T 156/1031; B29D 99/0003; B29C 70/462; B29C 66/721; B29C 70/44; B29C 66/7392; B29C 66/81455; B29C 66/43441; B29C 70/34; B29C 65/4835; B29C 2043/3649; B29C 70/48; B29C 43/3642; B29C 35/0288; B29C 51/28; B64C 1/064; B64C 3/26; B64C 1/06; B64C 3/18; B64C 1/065; B64C 3/182; B64C 3/185; B64C 1/068; B32B 2605/18; B32B 38/12; B32B 1/00
USPC ................. 156/214, 212, 250, 288, 312, 196; 264/320, 292, 295, 297.5, 297.6, 299, 264/319; 425/363, 369, 389, 391, 393
See application file for complete search history.

(56) References Cited

U.S. PATENT DOCUMENTS

| 1,433,879 A | 10/1922 | Fancher et al. |
| 1,965,716 A | 7/1934 | Thoms et al. |

(Continued)

FOREIGN PATENT DOCUMENTS

| CA | 2487697 A1 | 5/2006 |
| DE | 742682 C | 12/1943 |

(Continued)

OTHER PUBLICATIONS

International Search Report and Written Opinion, dated Sep. 30, 2014, regarding Application No. PCT/US2014/038916, 10 pages.

(Continued)

*Primary Examiner* — Jacob T Minskey
*Assistant Examiner* — Vishal I Patel
(74) *Attorney, Agent, or Firm* — Yee & Associates, P.C.

(57) ABSTRACT

Method and tooling apparatus for forming a composite charge into a contoured composite blade stringer including an elongate punch and an elongate die flexible along their lengths. The charge is press formed by using the punch to drive the charge into the die. The punch and the die are mounted between a pair of flexible plates. A press coupled with the plates contours the charge by bending the plates into a desired contour. The stringer is allowed to cool down to room temperature while being constrained, before withdrawing the stringer from the tooling apparatus in order to reduce wrinkling.

4 Claims, 17 Drawing Sheets

(51) Int. Cl.
  *B29C 70/46* (2006.01)
  *B29L 31/00* (2006.01)

(56) References Cited

U.S. PATENT DOCUMENTS

| | | |
|---|---|---|
| 3,693,924 A | 9/1972 | Blatherwick |
| 3,843,756 A | 10/1974 | Talbott et al. |
| 3,990,291 A | 11/1976 | Evertz et al. |
| 4,254,735 A | 3/1981 | Postupack et al. |
| 4,270,964 A | 6/1981 | Flaskett |
| 4,338,070 A | 7/1982 | Nava |
| 4,366,698 A | 1/1983 | Gill |
| 4,367,644 A | 1/1983 | Kramer et al. |
| 4,475,976 A | 10/1984 | Mittelstadt et al. |
| 4,504,341 A | 3/1985 | Radzwill et al. |
| 4,614,558 A | 9/1986 | Kobe |
| 4,657,717 A | 4/1987 | Cattanach et al. |
| 4,946,526 A | 8/1990 | Petty-Galis et al. |
| 4,980,013 A | 12/1990 | Lowery |
| 5,022,248 A | 6/1991 | Brooks et al. |
| 5,108,532 A | 4/1992 | Thein et al. |
| 5,188,787 A | 2/1993 | King et al. |
| 5,286,438 A | 2/1994 | Dublinski et al. |
| 5,304,057 A | 4/1994 | Celerier et al. |
| 5,327,764 A | 7/1994 | Weykamp et al. |
| 5,366,431 A | 11/1994 | Smith et al. |
| 5,366,684 A | 11/1994 | Corneau, Jr. |
| 5,464,337 A | 11/1995 | Bernardon et al. |
| 5,582,058 A | 12/1996 | Knudson |
| 5,707,576 A | 1/1998 | Asher |
| 5,714,179 A | 2/1998 | Goodridge et al. |
| 5,772,950 A | 6/1998 | Brustad et al. |
| 5,846,464 A | 12/1998 | Hoffman |
| 5,882,462 A | 3/1999 | Donecker et al. |
| 6,089,061 A | 7/2000 | Haas et al. |
| 6,139,942 A | 10/2000 | Hartness et al. |
| 6,299,819 B1 | 10/2001 | Han |
| 6,558,590 B1 | 5/2003 | Stewart |
| 6,723,272 B2 | 4/2004 | Montague et al. |
| 6,749,784 B2 | 6/2004 | Blanchon |
| 6,814,916 B2 | 11/2004 | Willden et al. |
| 6,855,284 B2 | 2/2005 | Lanni et al. |
| 6,929,770 B2 | 8/2005 | Caldwell, Jr. |
| 7,091,300 B2 | 8/2006 | Luhmann et al. |
| 7,118,370 B2 | 10/2006 | Willden et al. |
| 7,141,199 B2 | 11/2006 | Sana et al. |
| 7,306,450 B2 | 12/2007 | Hanson |
| 7,464,508 B2 | 12/2008 | Fournie et al. |
| 7,527,759 B2 | 5/2009 | Lee et al. |
| 7,622,066 B2 | 11/2009 | Brustad et al. |
| 7,655,168 B2 | 2/2010 | Jones et al. |
| 7,708,546 B2 | 5/2010 | Lee et al. |
| 7,713,603 B2 | 5/2010 | Farran et al. |
| 7,959,753 B2 | 6/2011 | Nunez Delgado et al. |
| 8,465,613 B2 * | 6/2013 | Rotter et al. .......... 156/212 |
| 8,551,382 B2 | 10/2013 | Anderson et al. |
| 8,557,165 B2 | 10/2013 | Jones et al. |
| 8,601,694 B2 | 12/2013 | Brennan et al. |
| 2004/0043196 A1 | 3/2004 | Willden et al. |
| 2004/0265536 A1 * | 12/2004 | Sana et al. .............. 428/119 |
| 2005/0142239 A1 | 6/2005 | Frank |
| 2007/0039284 A1 | 2/2007 | Munoz Royo et al. |
| 2009/0297358 A1 | 12/2009 | Anderson et al. |
| 2009/0320292 A1 | 12/2009 | Brennan et al. |
| 2010/0074979 A1 | 3/2010 | Cundiff et al. |
| 2010/0102482 A1 | 4/2010 | Jones et al. |
| 2011/0195230 A1 | 8/2011 | Hanson |
| 2013/0049258 A1 | 2/2013 | Rotter et al. |
| 2014/0203477 A1 | 7/2014 | Chapman et al. |

FOREIGN PATENT DOCUMENTS

| | | |
|---|---|---|
| DE | 4234002 A1 | 4/1994 |
| DE | 19536675 C1 | 2/1997 |
| EP | 0659541 A1 | 6/1995 |
| EP | 1136239 A2 | 9/2001 |
| EP | 1393873 A2 | 3/2004 |
| EP | 1439121 A2 | 7/2004 |
| EP | 1481790 A2 | 12/2004 |
| EP | 1972428 A2 | 9/2008 |
| EP | 2128019 A1 | 12/2009 |
| EP | 2128019 A2 | 12/2009 |
| EP | 2133263 A2 | 12/2009 |
| EP | 2561979 A2 | 2/2013 |
| FR | 2035314 A5 | 12/1970 |
| FR | 2667013 A1 | 3/1992 |
| FR | 2771332 A1 | 5/1999 |
| FR | 2844472 A1 | 3/2004 |
| GB | 2139934 A | 11/1984 |
| JP | 61043542 A | 6/1986 |
| JP | 2001310798 A | 11/2001 |
| JP | 2004352187 A | 12/2004 |
| WO | WO2004025003 A2 | 3/2004 |
| WO | WO2005095091 A1 | 10/2005 |
| WO | WO2006014825 A1 | 2/2006 |
| WO | WO2006039124 A2 | 4/2006 |
| WO | WO2006048652 A1 | 5/2006 |
| WO | WO2006113048 A2 | 10/2006 |
| WO | WO2007134790 A1 | 11/2007 |
| WO | WO2010047980 A1 | 4/2010 |

OTHER PUBLICATIONS

Notice of Allowance, dated Feb. 19, 2013, regarding U.S. Appl. No. 13/217,109, 11 pages.
"A Composite Preform", IP.com Prior Art Database Technical Disclosure No. IPCOM000007326D, dated Mar. 14, 2002, http://www.ip.com/IPCOM/000007326, 4 pages.
Ando et al., "Growing Carbon Nanotubes," Materials Today, Oct. 2004, vol. 7, No. 10, pp. 22-29.
Brittles, "New Developments in Resin Transfer Moulding," Proc. 19th International Composites Congress, Nov. 1994, pp. 11-26.
EP search report dated Oct. 18, 2011 regarding application 09251515.4, reference P106603EP00, applicant The Boeing Company, 9 pages.
EP search report dated Aug. 5, 2008 regarding application EP08012344, 2 pages.
EP search report, dated Sep. 23, 2010 regarding application EP09160765 (EP2128019), 6 pages.
Garcia et al., "Hybrid Carbon Nanotube-Composite Architectures," MTL Annual Research Report, Sep. 2006, p. 208.
Growing Carbon Nanotubes Aligned With Patterns, NASA Tech Briefs No. NPO-30205, Oct. 2002, http://nasatech.com/Briefs/Oct02/NPO30205.html, 2 pages.
PCT search report dated Oct. 16, 2006 regarding application PCT/US2006/010825, 4 pages.
PCT search report dated Jan. 27, 2010 regarding application PCT/US2009/060245, international filing date Sep. 10, 2009, applicant reference 08-0625PCT, applicant The Boeing Company, 5 pages.
Musch et al., "Tooling With Reinforced Elastomeric Materials," Composites Manufacturing, 1992, vol. 3, No. 2, pp. 101-111.
PCT search report, dated Dec. 7, 2005 regarding application PCT/US2005/026141 (WO2006014825), 3 pages.
Search report, dated May 19, 2006 regarding application PCT/US2005/033279 (WO2006039124), 5 pages.
The Longest Carbon Nanotubes You Have Ever Seen, http://www.spacemart.com/reports/The_Longest_Carbon_Nanotubes_You_Have_Ever_Seen_999.html, May 14, 2007, 1 page.
"The Wondrous World of Carbon Nanotubes", Eindhoven University of Technology, Feb. 27, 2003, 26 pages. http://students.chem.tue.nl/ifp03/Wondrous%20World%20of%20Carbon%20Nanotubes_Final.pdf.
Office Action, dated Nov. 16, 2012, regarding U.S. Appl. No. 12/128,173, 18 pages.
Final office action dated Jan. 17, 2012 regarding U.S. Appl. No. 12/258,404, 3 pages.
Final office action dated Mar. 11, 2011 regarding U.S. Appl. No. 12/258,404, 8 pages.

(56) References Cited

OTHER PUBLICATIONS

Final office action dated Aug. 27, 2010 regarding U.S. Appl. No. 12/258,404, 10 pages.
Non-final office action dated Mar. 9, 2010 regarding U.S. Appl. No. 12/258,404, 9 pages.
Non-final office action dated Jul. 20, 2011 regarding U.S. Appl. No. 12/258,404, 6 pages.

* cited by examiner

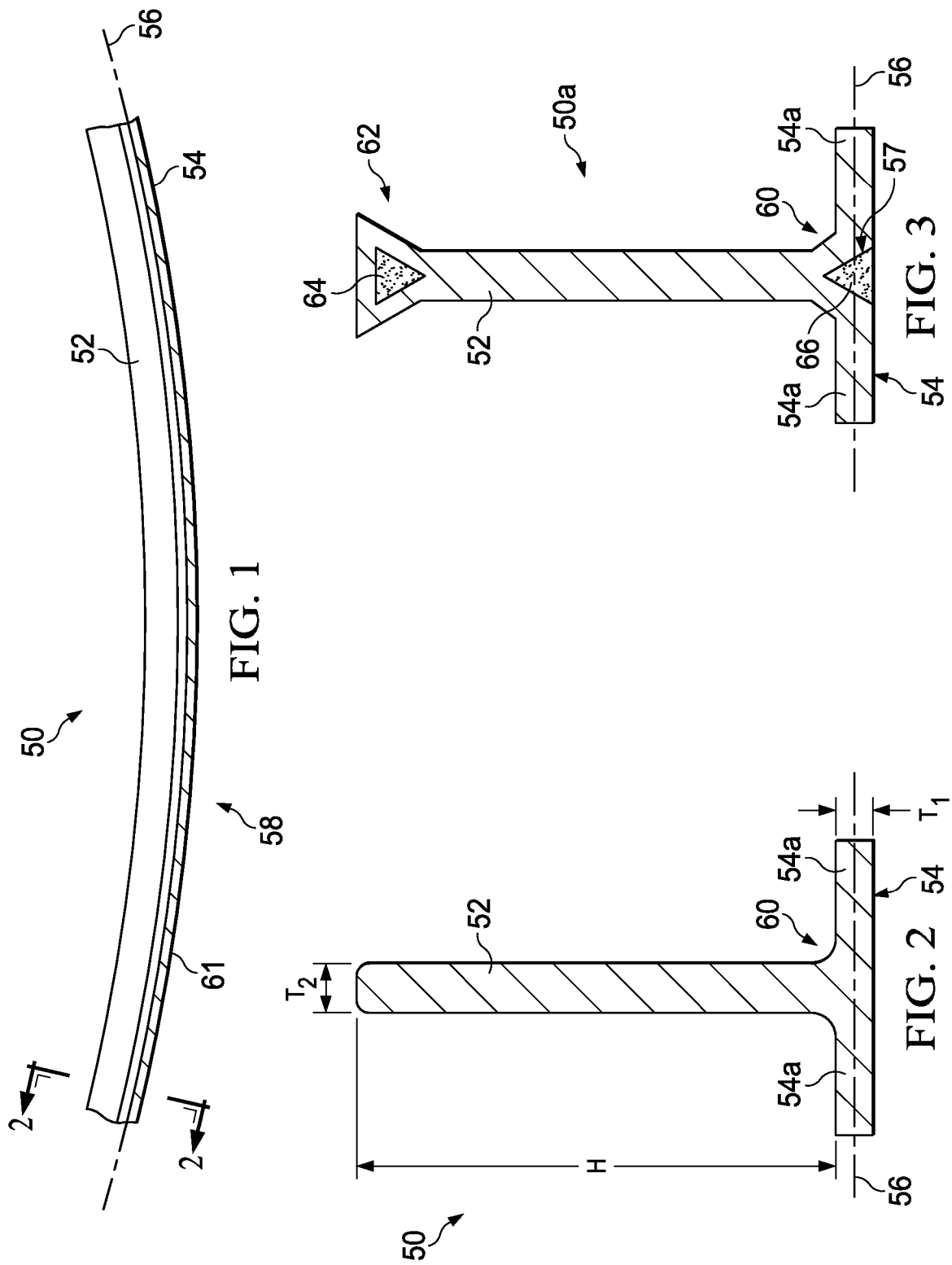

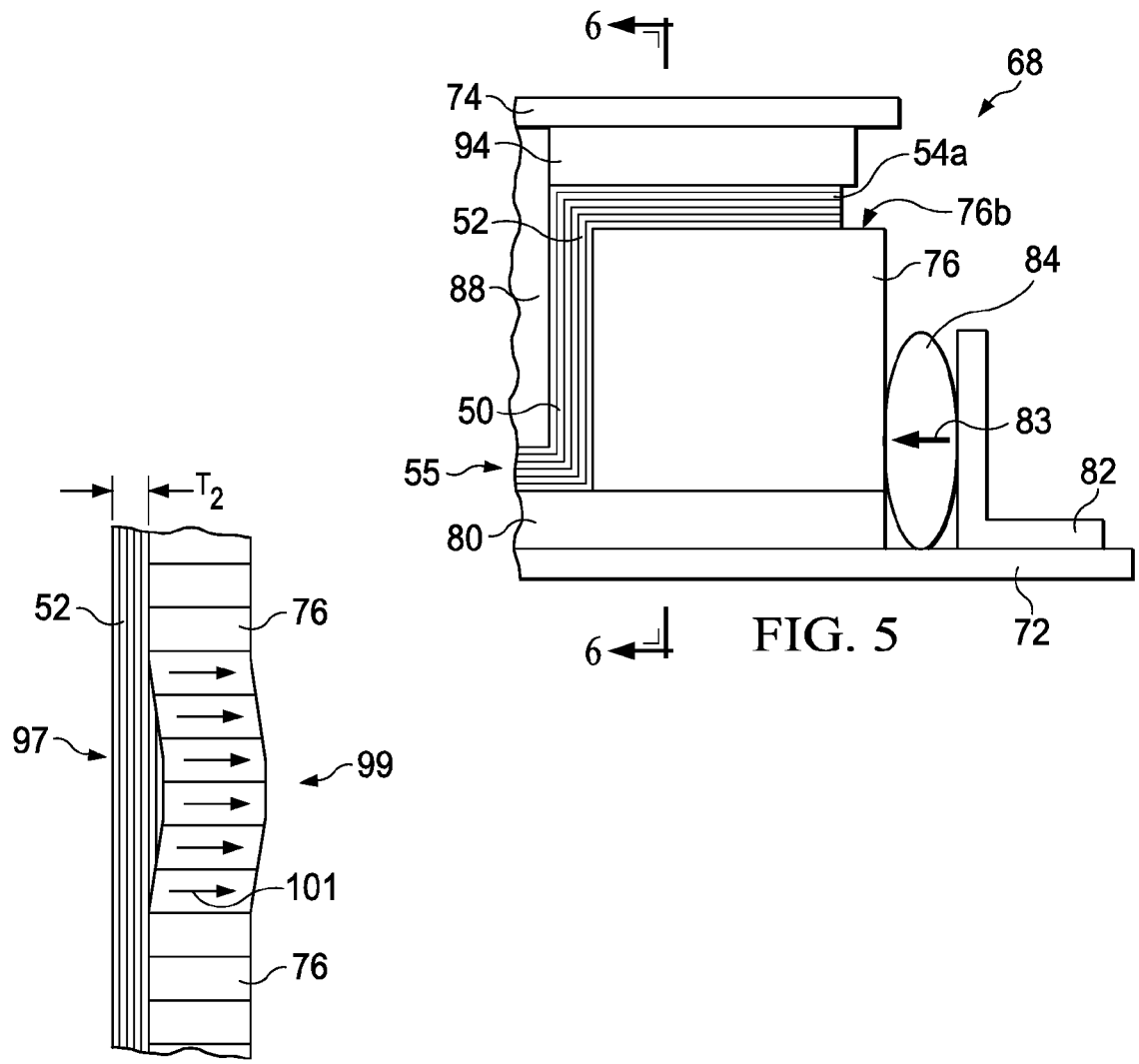
FIG. 5
FIG. 6A
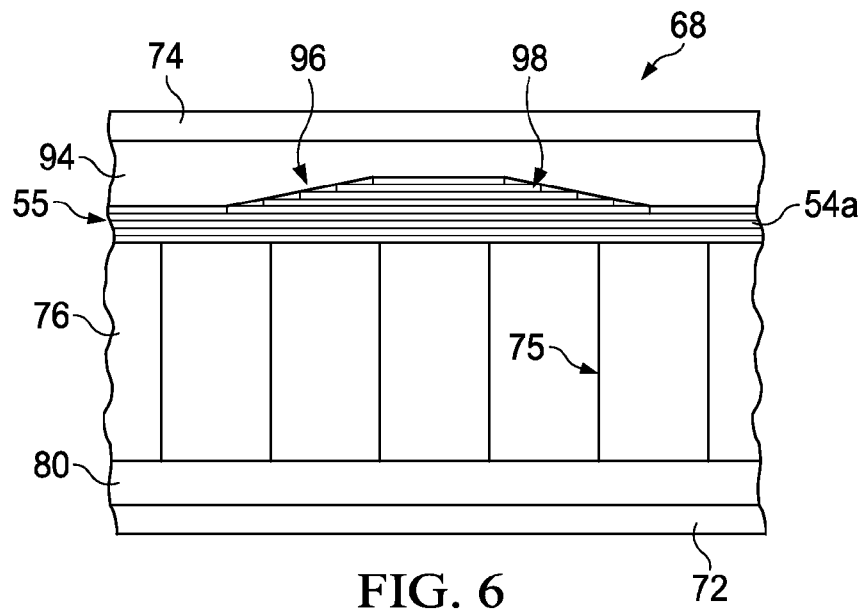
FIG. 6

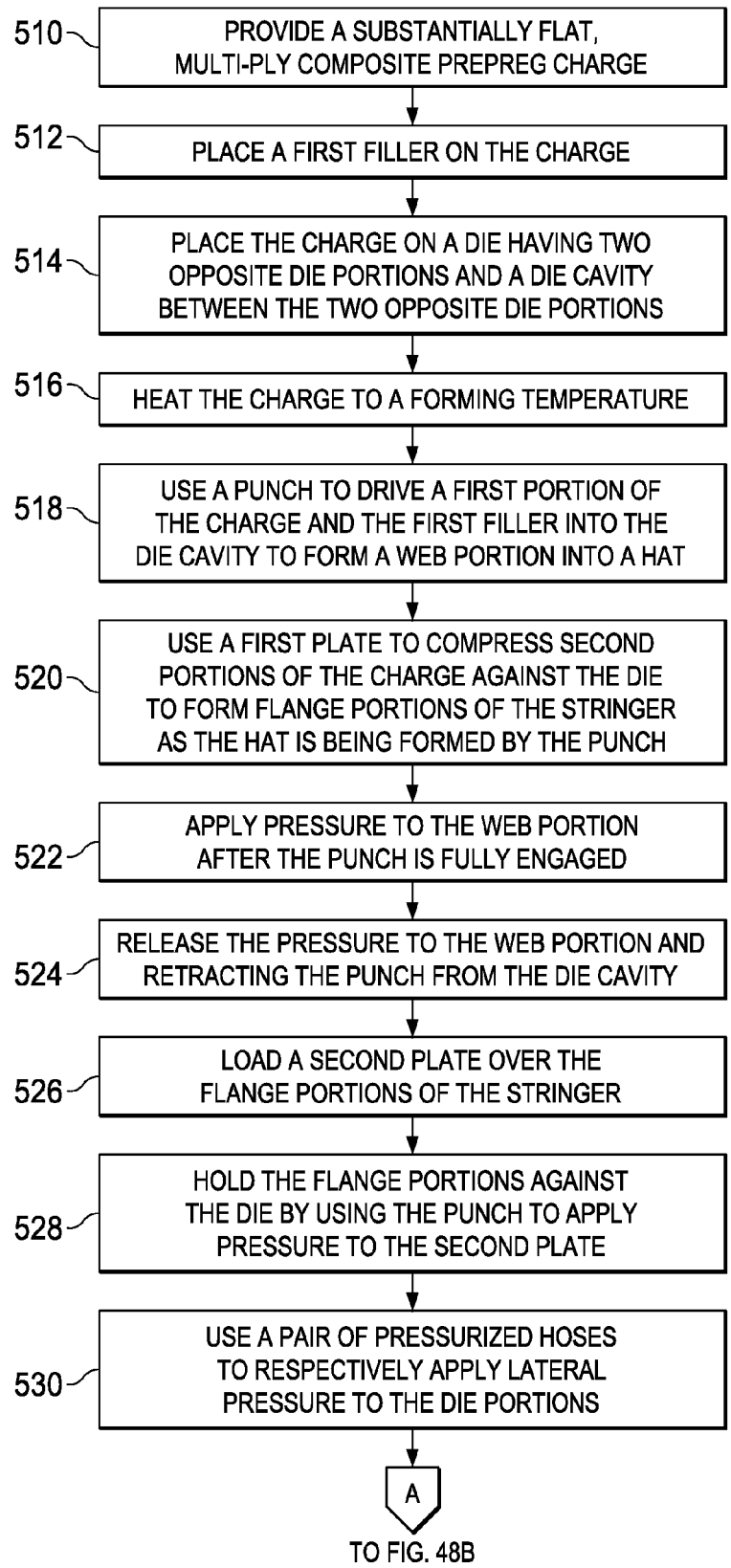

METHOD AND APPARATUS FOR FABRICATING VARIABLE GAUGE, CONTOURED COMPOSITE STIFFENERS

CROSS REFERENCE TO RELATED APPLICATIONS

This application is a continuation-in-part application of U.S. patent application Ser. No. 13/217,109, filed Aug. 24, 2011, status, allowed.

This application is related to co-pending U.S. patent application Ser. No. 12/258,404 filed Oct. 25, 2008, and U.S. patent application Ser. No. 12/128,173 filed May 28, 2008, status, allowed, both of which are incorporated by reference herein in their entireties.

BACKGROUND INFORMATION

1. Field

This disclosure generally relates to the fabrication of composite structures, and deals more particularly with a method and apparatus for forming flat composite charges into contoured, reinforcing substructures, such as variable gauge blade stiffeners.

2. Background

Composite reinforcing substructures such as blade stiffeners, sometimes referred to as blade stringers, are frequently used in the marine and aircraft industries. These stringers may be fabricated by combining two or more stiffening members. For example, blade-type stringers can be fabricated by combining two members having L or C cross sectional shapes, back-to-back. These members may be formed by manually hot drape forming multiple composite charges over a mandrel or other tool. After forming, the members are placed back-to-back and co-cured in an autoclave. Fabricating blade stringers using multiple separate charges requires multiple tools, is relatively labor intensive and may add to manufacturing flow times.

In some applications, stiffeners such as the blade stringers mentioned above, may need to be contoured along their lengths in order to conform them to a structure such as a contoured aircraft skin, to which they are to be attached. Difficulty may be encountered, however, when attempting to form highly contoured stringers using conventional tooling because of the tendency of the plies in the charge to wrinkle as the charge is being compressed. Accordingly, fabrication of highly contoured stringers using composites is generally limited to hand layup techniques in which each ply is laid up by hand over a die or other tool in order to reduce the possibility of ply wrinkling. The hand layup technique is labor intensive, and thus costly as well as relatively slow. An added challenge is presented where one or more areas of the stringer include ply drop-offs and/or pad-ups in order to conform the stringer to local contouring of the skin.

Accordingly, there is a need for a method and apparatus for fabricating composite stiffeners such as blade stringers using a single composite charge formed with relatively simple tooling. There is also a need for a method and apparatus of the type mentioned above that allows contouring of the stringer along its length, including localized contouring using ply drop-offs or pad-ups.

SUMMARY

The illustrative embodiments also provide for a method for fabricating blade type stringers using simplified tooling to form a single composite charge into a desired stringer configuration. Tooling costs and process flow times may be reduced by eliminating the need to form multiple charges and assemble multiple stiffener members in order to achieve the desired stringer configuration. The embodiments allow localized contouring of the stringer by accommodating ply pad-ups and ply drop-offs along the length of the stringer. The charge may be contoured along its length during forming with reduced ply wrinkling and/or reduced ply misalignment.

The illustrative embodiments also provide for an apparatus for forming a composite charge into a contoured blade stringer. The apparatus comprises an elongate punch flexible along its length and an elongate die flexible along its length against which a substantially flat composite charge may be press formed by the punch. The apparatus further includes first and second flexible plates respectively backing the first and second plies, and a press coupled with the blades for forming the punch and the die into a desired contour.

The illustrative embodiments also provide for an apparatus for forming a composite charge into a contoured blade stiffener having a flange with at least one thickness variation. The apparatus includes first and second flexible plates, an elongate punch, and an elongate die. A substantially flat composite charge may be press formed between the punch and the die. The punch and the die are flexible along their respective lengths and are sandwiched between the first and second plates. The apparatus includes at least a first shim located between one of the plates and the die for maintaining substantially constant pressure on the charge across the thickness variation during press forming. The apparatus further comprises a press for bending the plates to contour the parts and die. The shim is generally flexible.

The illustrative embodiments also provide for a method for fabricating a composite blade stiffener. The method comprises forming a substantially flat charge by first placing the charge in a die and heating the charge to a forming temperature using a heating blanket. The substantially flat charge is formed into a hat-shape having a pair of flanges by using the punch to drive the charge into a cavity in a die. Next, pressure is applied to the web of the blade, the web being a portion of the blade that is about vertical relative to the pair of flanges. The punch is then removed from the cavity in the die, a plate is loaded over the die, and the hat shape is formed into the blade by using the die to squeeze the hat while the pair of flanges is held against the die. The blade is contoured by being held under pressure until the contoured blade cools to room temperature.

The illustrative embodiments also provide for a method for fabricating a contoured composite blade stiffener. The method comprises placing a substantially flat composite charge on a die and forming the flat charge into a hat using a punch to press the form against the charge into a cavity in the die. The method further comprises contouring the formed charge by bending the die while the formed charge is in the die. Contouring the formed charge includes bending the punch while the punch is in the die.

The illustrative embodiments also provide for a method of forming a variable gauge contoured composite blade stringer. The method comprises placing a first filler on a substantially flat, multi-ply composite prepreg charge. Next, the charge is placed on a die having two opposite die portions and a die cavity between the two opposite die portions. The charge is heated to a forming temperature and then a web portion is formed into a hat by using a punch to drive a first portion of the charge and the first filler into the die cavity. The method then comprises forming flange portions of the stringer as the hat is being formed by the punch, applying pressure to the web portion after the punch is fully engaged, and releasing the pressure to the web portion and retracting the punch from the die cavity. Lateral pressure is applied against the die portions using pressurized hoses, and the hat is pressed between the die portions, creating a formed charge. The formed charge is further contoured using the punch to apply pressure to a second plate and compress a second filler, an adhesive, and a fabric layer. A formed stringer is removed from the die after the formed and contoured blade has reached room temperature.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration of a side view of a contoured composite blade stringer fabricated with the disclosed method and apparatus.

FIG. 2 is an illustration of a sectional view taken along the line 2-2 in FIG. 1.

FIG. 3 is an illustration similar to FIG. 2, but showing an alternate form of the stringer.

FIG. 5 is an illustration of a sectional view taken along the line 5-5 in FIG. 6, but showing a charge being formed.

FIG. 6 is an illustration of a sectional view taken along the line 6-6 in FIG. 5.

FIG. 6A is a plan view of a portion of a blade having a pad-up, showing how the die blocks shift to conform to the contours of the blade during the forming process.

FIGS. 48A-48B are a flowchart of a method for fabricating a composite blade stiffener shown in FIGS. 1 and 3, according to an advantageous embodiment.

DETAILED DESCRIPTION

Figure 4:
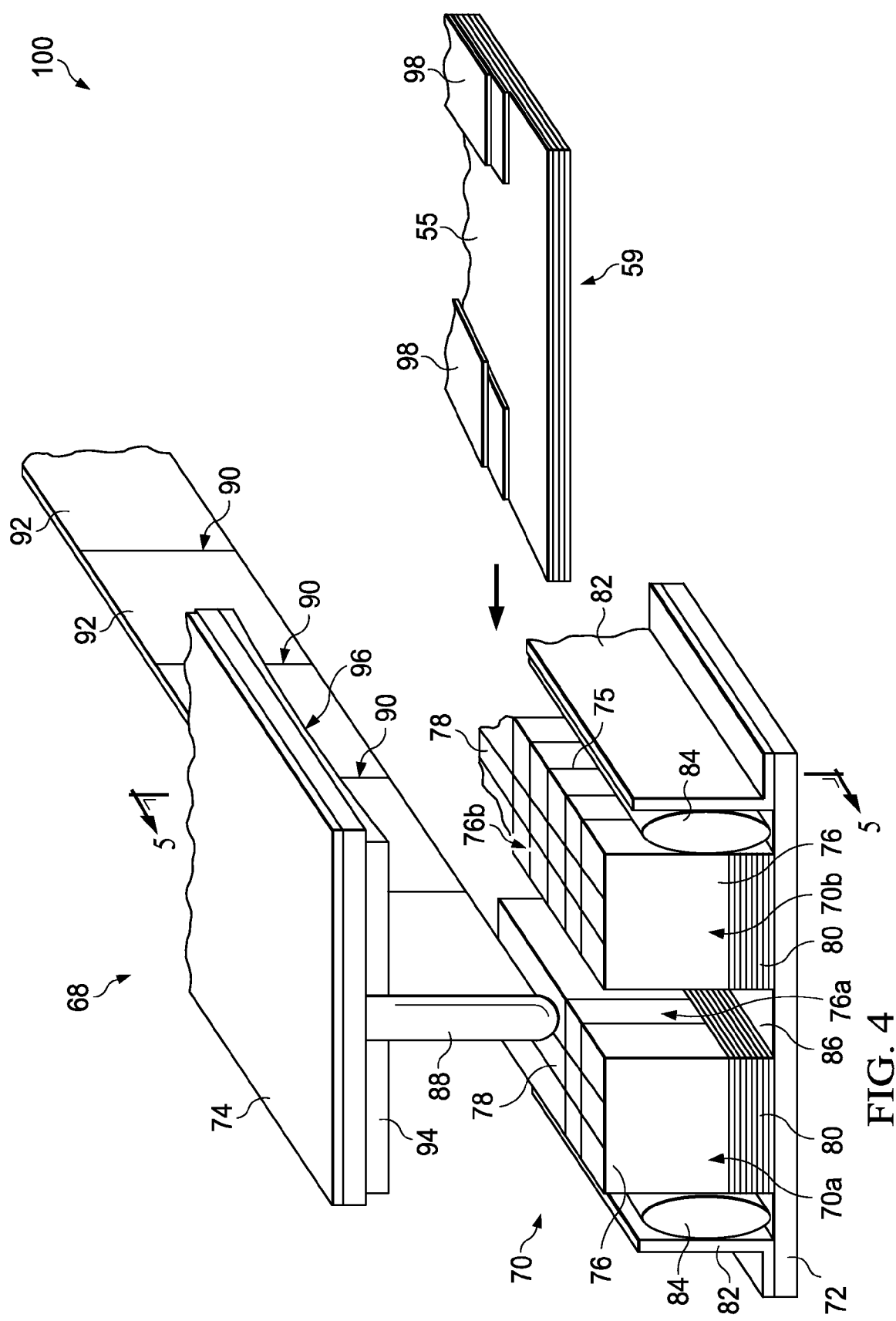
FIG. 4 is an illustration of a perspective view of tooling apparatus used to form a substantially flat charge into the blade stringers shown in FIGS. 1-3.

Referring first to FIGS. 1 and 2, the disclosed embodiments relate to a method and apparatus for fabricating an elongate, composite stiffener, such as a blade type stringer 50 having a substantially flat blade 52 and a flange 54 extending substantially perpendicular to the blade 52. The flange 54 includes a pair of flange portions 54a laterally extending from one end of the blade 52, and connected to the blade 52 by a radius section 60. The blade stringer 50 may have one or more contours 58 along its length. In the illustrated embodiment, the stringer 50 has a substantially constant contour 58 in the curved plane 56 of a flange 54. In other embodiments, the stringer 50 may have one or more of the contours 58 which may or may not be of constant curvature. Also, as will be discussed later in more detail, the flange 54 may have a variable gauge or thickness $T_1$ at one or more locations along its length in order to conform the stringer 54 to localized contours of a structure to which it is attached, such as an aircraft skin 61. Also, the thickness $T_2$ and/or a height H of the blade 52 may vary along the length of the stringer 50.

The disclosed method and apparatus may be used to fabricate other configurations of blade-type stringers 50, such hybrid-I stringer 50a shown in FIG. 3. Stringer 50a comprises a blade 52 having an angularly shaped outer end 62, and a flange 54. The blade end 62 includes a triangularly shaped, composite filler 64, however other filler shapes are possible. The flange 54 includes a V-shaped groove 57 at the intersection of flange portions 54a with the blade 52. The groove 57 is filled with a composite filler 66 having a triangularly shaped cross section substantially matching that of the groove 57. Each of the fillers 64, 66 may comprise an adhesive that may or may not be reinforced with fibers, or alternatively, may comprise strips (not shown) of prepreg tape.

FIGS. 4-6 illustrate tooling apparatus 68 that may be employed to form the stringers shown in FIGS. 1-3 using a single, substantially flat, multi-ply composite charge 55. The charge may comprise multiple plies 59 of composite material, such as, without limitation, a carbon fiber epoxy prepreg, and may include pad-ups 98 to conform the flange 54 (FIG. 2) of the stringer 50 to local contours, such as local contours of the skin 61. The tooling apparatus 68 broadly comprises a lower die 70, an upper punch 88 and a pair of flexible plates 72, 74, upon which the die 70 and punch 88 are respectively mounted. Die 70 comprises a pair of die portions 70a, 70b which are spaced apart to form a die cavity 86 and are slideable, substantially laterally, toward and away from each other on plate 72. Each of the die portions 70a, 70b is segmented at 75 and comprises a plurality of die blocks 76 which, in the illustrated example have a generally rectangular cross section, however other cross sectional shapes are possible.

The die blocks 76 are aligned in side-by-side relationship along the length of the plates 72, 74 and are joined together by flexible connectors 78 which may comprise, for example and without limitation, a flexible metal strap. The die blocks 76 are mounted on plate 72 and are interconnected by connectors 78 such that their respective axes remain neutral during the forming and contouring of the charge 55. The die blocks 76 may comprise any suitable, relatively rigid material, such as wood, metal, ceramic or a composite, and include inner forming surfaces 76a and upper forming surfaces 76b. A pair of L-shape, elongate brackets 82 are mounted on the plate 72, on opposite sides of die 70, and function to both retain the die blocks 76 on the plates 72 as well as react lateral forming forces generated by the die blocks 76. A pair of inflatable hoses 84, sometimes referred to as bags or bladders, are sandwiched between the brackets 82 and the die blocks 76, which are adapted to be coupled with a suitable source of pressurized air (not shown). The hoses 84 may be selectively pressurized in order to apply a lateral force on the die blocks 76 during forming and/or contouring operations. Other mechanisms, however, may be provided to apply lateral force to the die blocks 76.

The punch 88 is substantially flat and includes slits 90 that segment the punch 88 into a plurality of punch portions 92 that allow the punch 88 to flex along its length in a plane (not shown) that is substantially perpendicular to the plane 56 (FIGS. 1 and 2) of the flange 54. The punch 88 may be formed of any suitable rigid material, such as metal, ceramic or a composite.

As previously mentioned, the stringer 50 may have a variable flange thickness $T_1$ in localized areas along its length in order to conform the stringer 50 to local contours of the skin 61 (FIG. 1). In order to accommodate these thickness variations so that constant pressure is applied to the charge 55 in these localized areas, suitable contoured lower and upper shims 80, 94 respectively may be provided. For example, as shown in FIGS. 4 and 6, the charge 55 may include pad-up plies 98 in the area of the flange portions 54a (FIG. 2). In order to assure that substantially even forming pressure is applied over the area of the pad-up plies 98, the upper shims 94 includes a contour 96 that substantially conforms to the cross sectional shape of the pad-up plies 98. Although not shown in the Figures, the lower shims 80 may also contain one or more contours along their lengths beneath the die blocks 76 in order to accommodate thickness variations in the flange portions 54a of the stringer 50. Also, the lower shim 80 may be tapered (not shown) in the area beneath the die cavity 86 (FIG. 4) in order to alter the blade height along its length. The shims 80, 94 may be formed of any substantially non-compressible material that will transmit force to the charge 55, yet is flexible to the degree necessary to allow the shims 80, 94 to bend during contouring of the tooling apparatus 68.

Referring to FIG. 6A, as previously mentioned, the thickness $T_2$ of the stringer blade 52 may vary along its length. For example, the blade 52 may have local pad-ups 97 which increase the blade thickness $T_2$. During the forming process, the die blocks 76 in the area 99 of the pad-up 97 slide 101 laterally outward on the lower plate 72, so as to conform to the contour presented by the pad-up 97, and maintain substantially constant forming pressure on blade 52.

Figure 7:
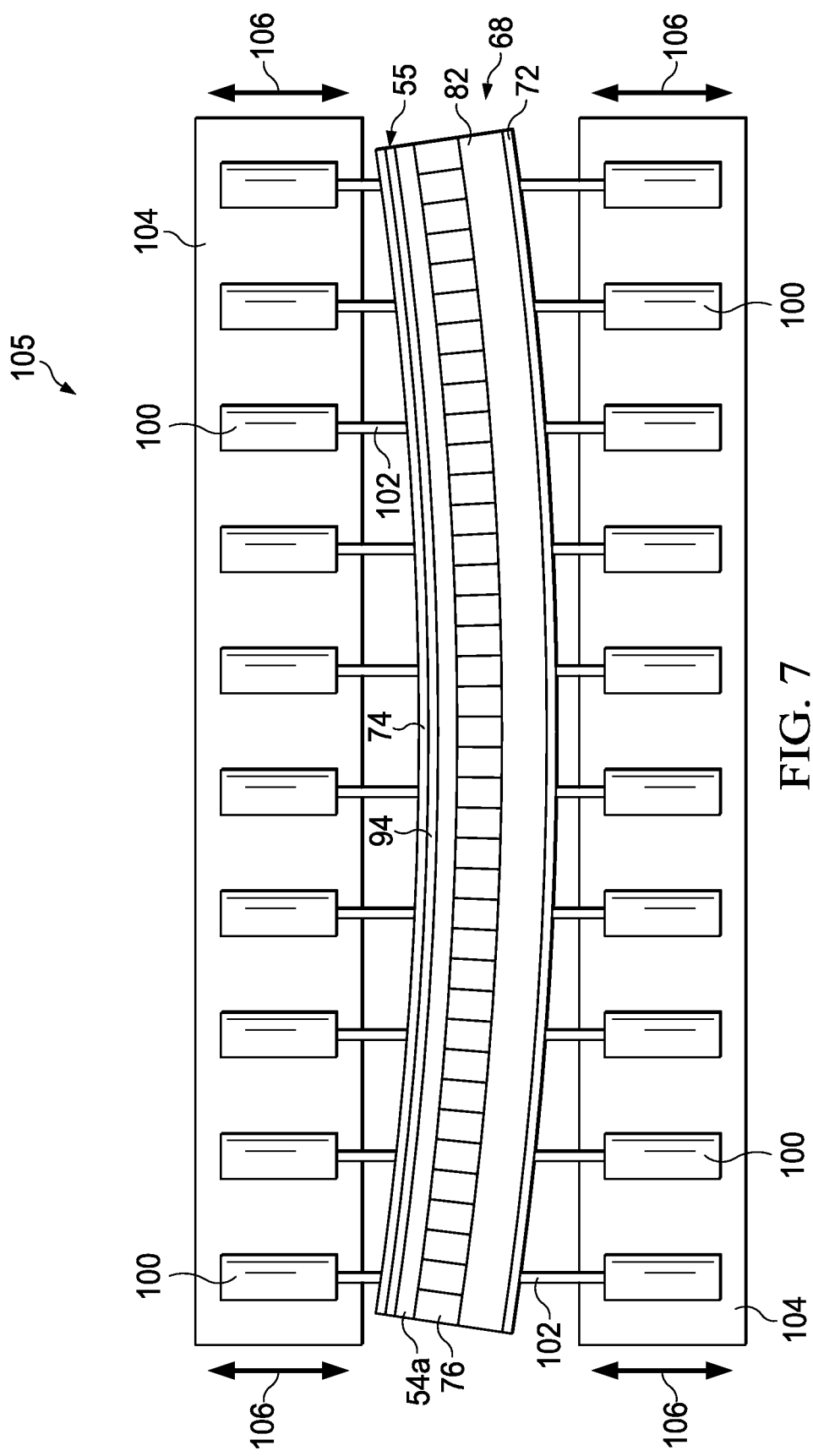
FIG. 7 is an illustration of a plan view of a die and punch contour changing mechanism employing the tooling apparatus shown in FIG. 4.

FIG. 7 illustrates a die and punch contour changing mechanism 105 incorporating the tooling apparatus 68 shown in FIGS. 4-6. The die and punch contour changing mechanism 105 may comprise, for example and without limitation, a press 105. A plurality of individual, spaced apart actuators 100 are respectively mounted on opposing press plates 104 which are adapted for movement toward and away from each other, as shown by the arrows 106. The tooling apparatus 68 is disposed between the press plates 104. The press plates 104 may be coupled with suitable power operated mechanisms such as cylinder actuators (not shown) for displacing the press plates 104, which open and close the tooling apparatus 68 during a charge forming operation. Each of the actuators 100 includes a plunger 102 coupled with one of the plates 72, 74 that applies a force to the plates 72, 74, in order to bend the plates 72, 74 which in turn longitudinally contours the tooling apparatus 68, and thus the formed charge 55. Other mechanisms may be employed to longitudinally contour the tooling apparatus 68 such as that disclosed in US Patent Publication 20100102482 published Apr. 29, 2010, the entire disclosure of which is incorporated by reference herein.

Figure 8:
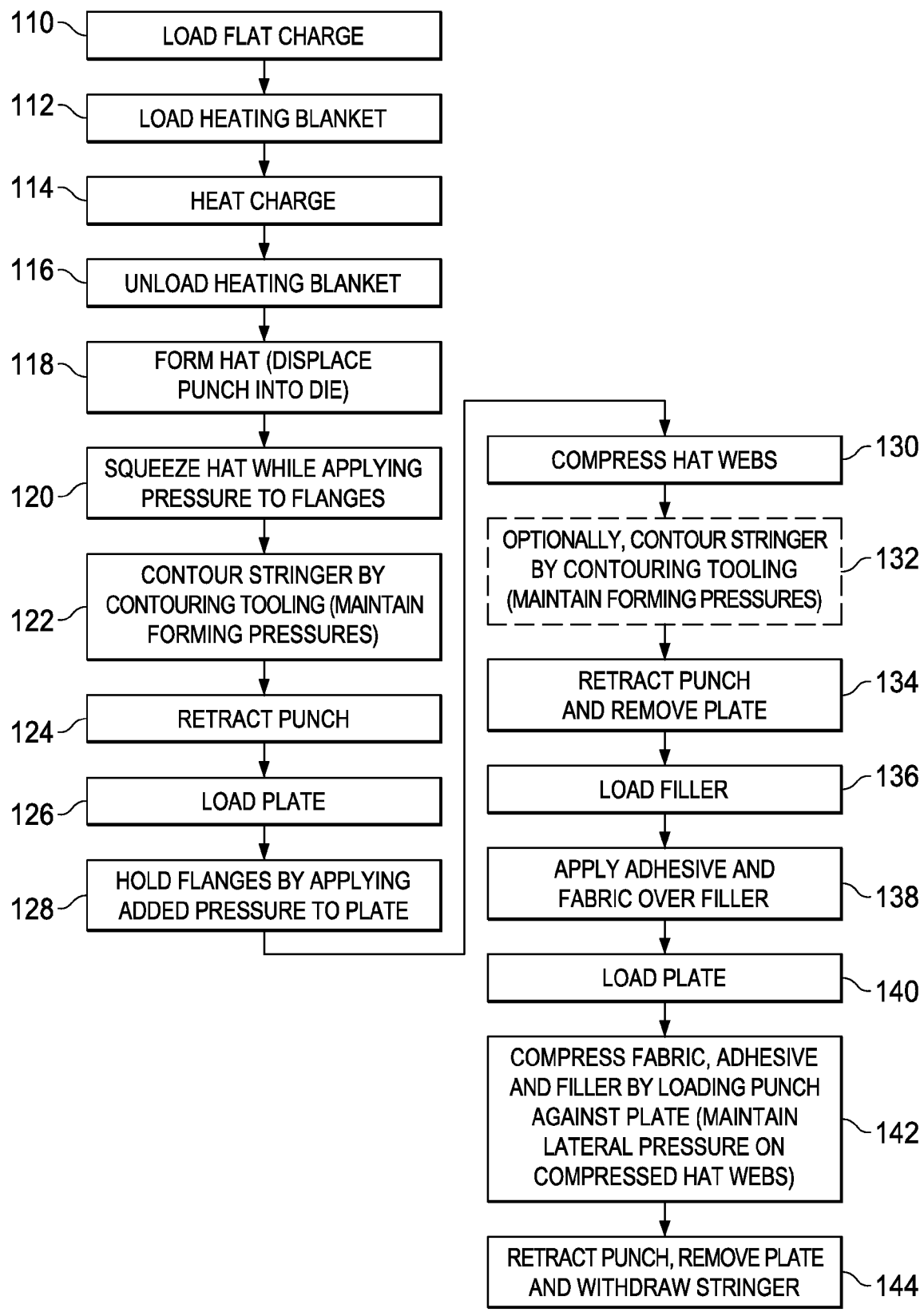
FIG. 8 is an illustration of a flow diagram of a method of fabricating the contoured blade stringer shown in FIGS. 1 and 2.
Figure 10:
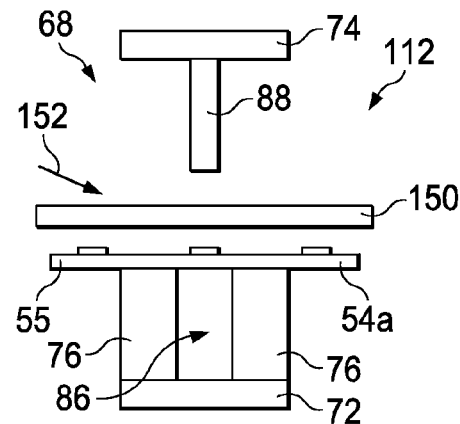
Figure 11:
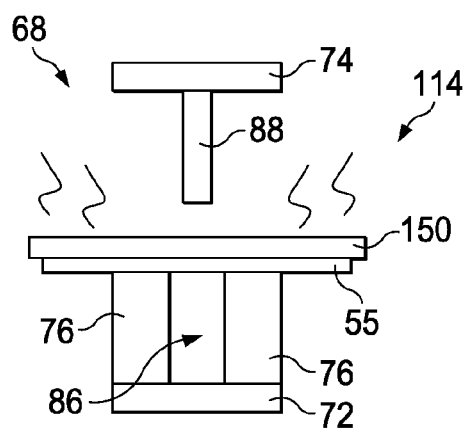
Figure 12:
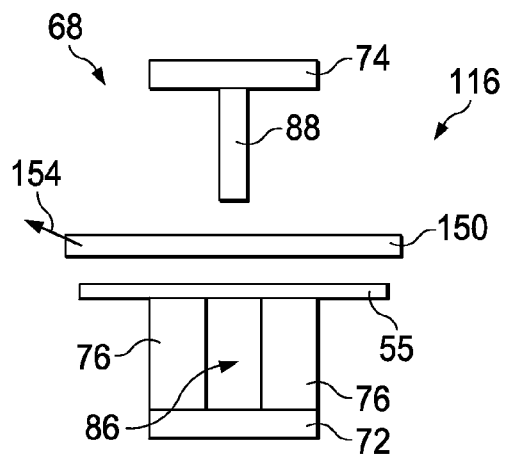
Figure 13:
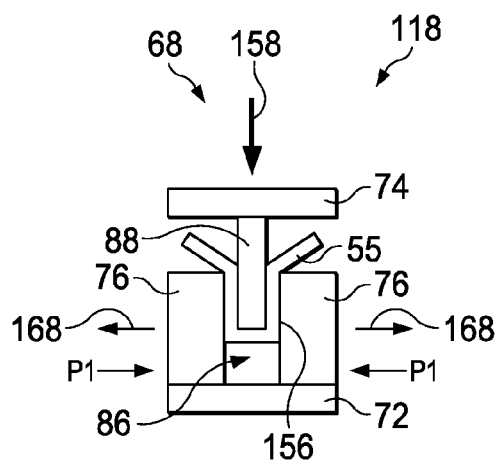

Attention is now directed to FIG. 8 which describes the individual steps of a method of fabricating contoured blade stringers; these steps are also sequentially shown, in diagrammatic form, in FIGS. 9-25. Beginning at step 110, a substantially flat, multi-ply composite charge 55 is loaded 146 onto the die blocks 76 (FIG. 9), with punch 88 in a raised position. A central blade portion 52 of the charge 55 overlies die cavity 86, and the outer flange portions 54a of the charge 55 extend laterally beyond the die blocks 76. Strips of adhesive 148 may be placed on the charge 55, either before or after the charge 55 is loaded onto the die blocks 76. Next, as shown at 112 in FIG. 8, a heating blanket 150 (FIG. 10) is loaded 152 onto the charge 55. Next, at 114, the charge is heated (FIG. 11) using the heating blanket 150, thereby softening the charge 55 to a suitable forming temperature. Other types of heating devices may be used to heat the charge 55, including but not limited to radiant and inductive type heaters (not shown). At step 116, the heating blanket 150 is unloaded at 154, as shown in FIG. 12. At step 118, a blade portion 52 of the charge 55 is formed into a hat 156 (FIG. 13) by forcing 158 the punch 88 into the die cavity 86. As the hat 156 is being formed as shown in FIG. 13, a first intermediate level of pressure P1 is applied to the die blocks 76 by the hoses 82 in order to maintain the die blocks 76 loaded against the charge 55. However this intermediate level of pressure P1 is less than the laterally outward pressure developed by the punch 88, consequentially although loaded against the hat 156, the die blocks 76 move laterally outwardly 168 until the hat section 156 is fully formed within the cavity 86.

Next, at step 120, while laterally inward pressure P1 is maintained against the hat 156 by the die blocks 76 (FIG. 14), the top plate 74 applies pressure 164 to the flange portions 54a, forming the latter down against the die blocks 76. Optionally, at step 122, the partially formed charge 55 is contoured (FIG. 15) by contouring 85 the tooling apparatus 68 while laterally inward pressure P1 continues to be maintained on the hat 156 by the die blocks 76. Contouring 85 of the tooling apparatus 68 may be performed by the press shown in FIG. 7 previously described which bends the plates 72, 74 in a plane (not shown) that is substantially parallel to the plane 56 of the flange 54 (see FIGS. 1 and 2). As plates 72, 74 are bent into a desired curvature, both the punch 88 and the die 78 flex and conform to the curvature of the plates 72, 74. As previously described in connection with FIGS. 4-6, the upper and lower shims 80, 94 maintain substantially constant forming pressure on the flange portions 54a as the tooling apparatus 68 is being contoured 85 to the desired shape.

Figure 16:
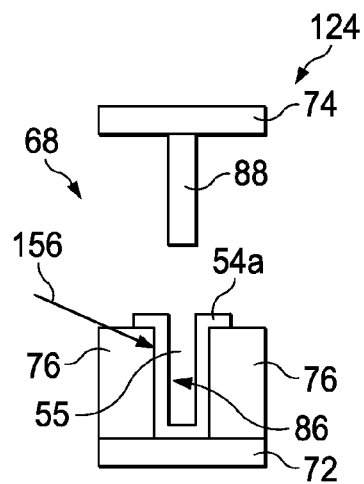
Figure 17:
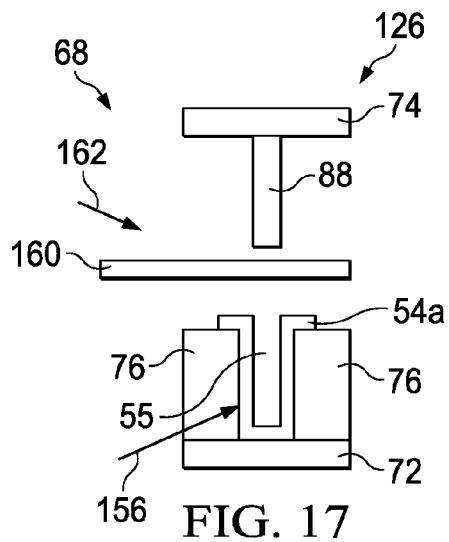
Figure 18:
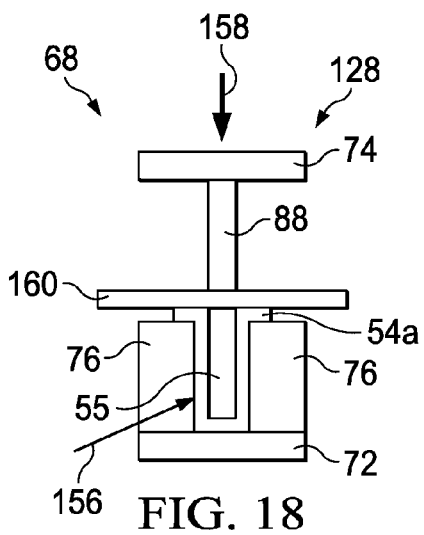

At step 124 in FIG. 8, the punch 88 is retracted from the die cavity 86 (FIG. 16). Next, at step 126, a substantially flat plate 160 (FIG. 17) is loaded 162 onto the flange portions 54a. At step 128, the punch 88 is lowered 158 (FIG. 18) into contact with the plate 160, thereby loading the plate 160 against the flange portions 54a, thereby immobilizing the flange portions 54a. Next, at step 130, while the flange portions 54a are held in place against the die blocks 76 by the force applied by the plate 160 and the punch 88, pressure P2 (FIG. 19) is applied to the die blocks 76 by the hoses 82 which squeeze the hat 156 into a blade 52. The pressure P2 is a forming pressure that is greater than pressure P1 applied to the die blocks 76 during steps 118-122.

Figure 21:
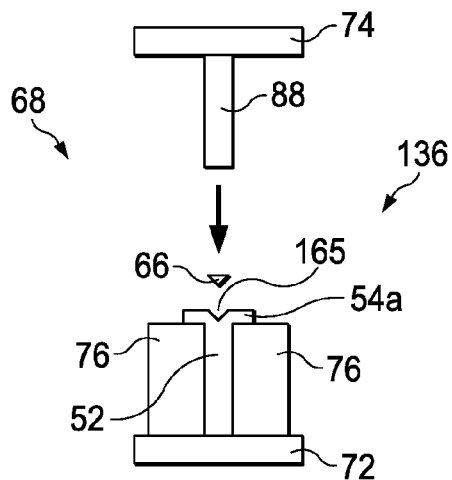
Figure 22:
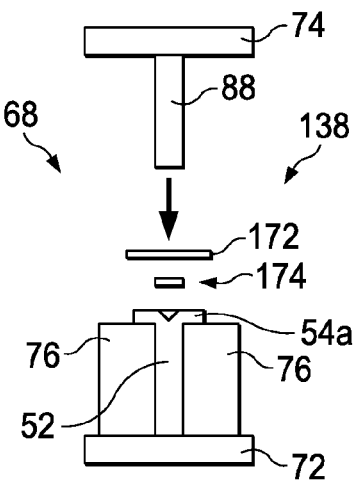
Figure 23:
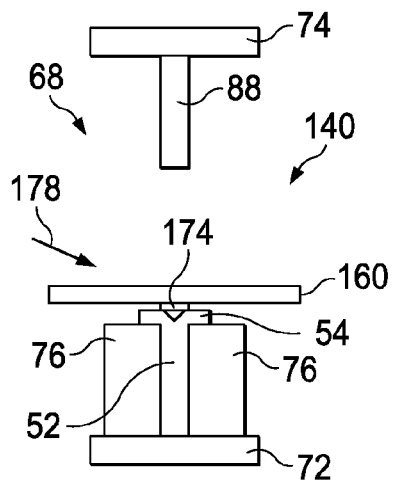
Figure 24:
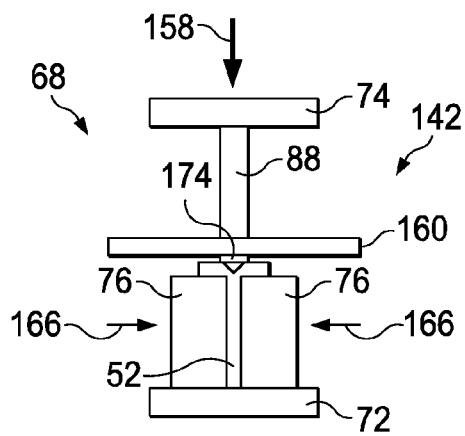
Figure 25:
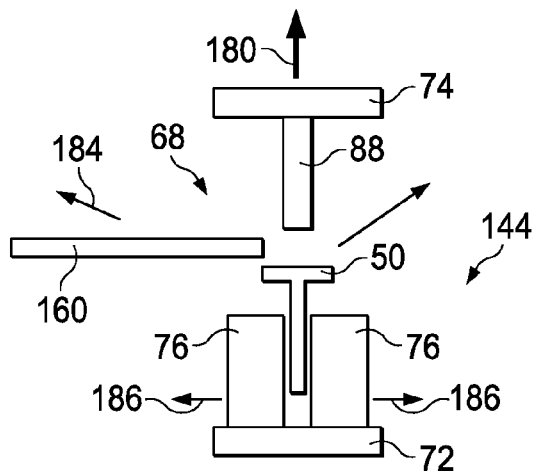

At step 134 shown in FIG. 8, the punch 88 is retracted 180 (FIG. 20), and the plate 160 is removed 167 leaving a V-shaped groove 165 between the flange portions 54a. At step 136 shown in FIG. 8, a composite filler 66 is placed in the groove 165, as shown in FIG. 21. Next, at step 138, a strip of adhesive 174 (FIG. 22) and a layer of fabric 172 are placed over the filler 66. At step 140, plate 160 is reloaded, overlying the flange 54 (FIG. 23). Then, as shown in step 142, the fabric layer 172, adhesive strip 174 and the filler 66 are compressed by displacing the punch downwardly as shown in FIG. 24 into contact with plate 160. Finally, at step 144, and is shown in FIG. 25, the punch 88 is retracted 180, the plate 160 is removed 184, allowing the fully formed blade stringer 50 to be withdrawn from the tooling apparatus 68.

Figure 15:
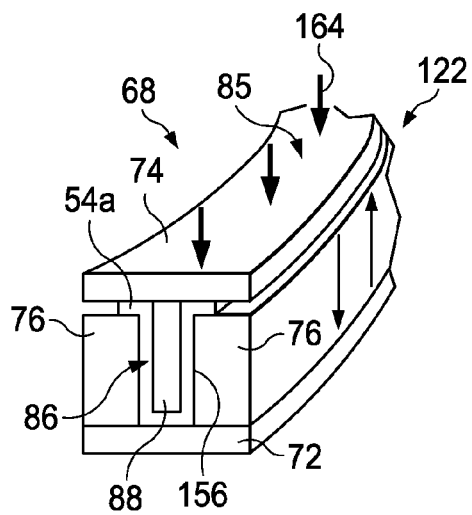

It should be noted here that in the method embodiment just described, contouring of the tooling apparatus 68 is performed when the charge 55 is in a partially formed state as shown in FIG. 15.

Figure 19:
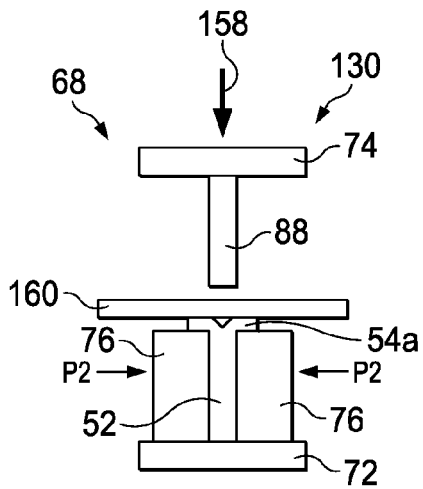
Figure 20:
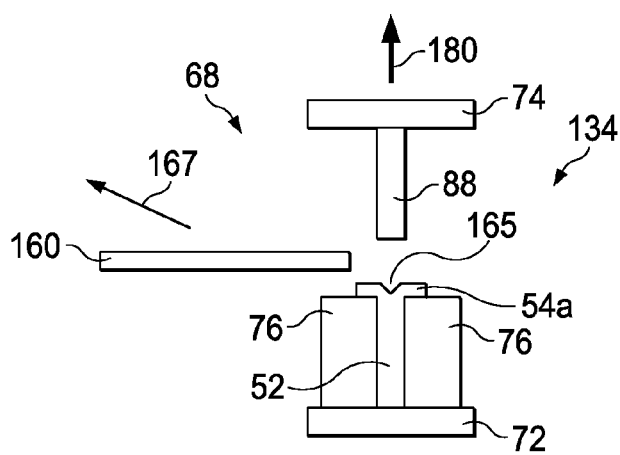

Alternatively, however, the charge 55 may be contoured at step 132, after the hat 156 has been compressed into the blade 52 shown in FIG. 19. Contouring of the tooling apparatus 68 is optional and not required when using the tooling apparatus 68 to form substantially straight stringers (not shown). When stringer contouring is not required, it is not necessary to perform steps 122-132. In either case, the disclosed method may advantageously allow ply slippage during the forming and/or contouring processes which may reduce ply wrinkling and result in finished parts that have superior characteristics and/or exhibit improved performance. Furthermore, in another embodiment, contouring of the charge 55 along its length is performed after the blade portion 52 is formed, but prior to forming the flange portions 54a onto the die blocks 76. The filler 66 is placed in the groove 165 after the flange portions 54a have been formed on the contoured blade portion 52. This latter mentioned method embodiment may facilitate the contouring process, particularly where more highly contoured stringers 50 are being fabricated, resulting in improved part quality with less wrinkling and/or easier contouring of the charge 55.

Figure 26:
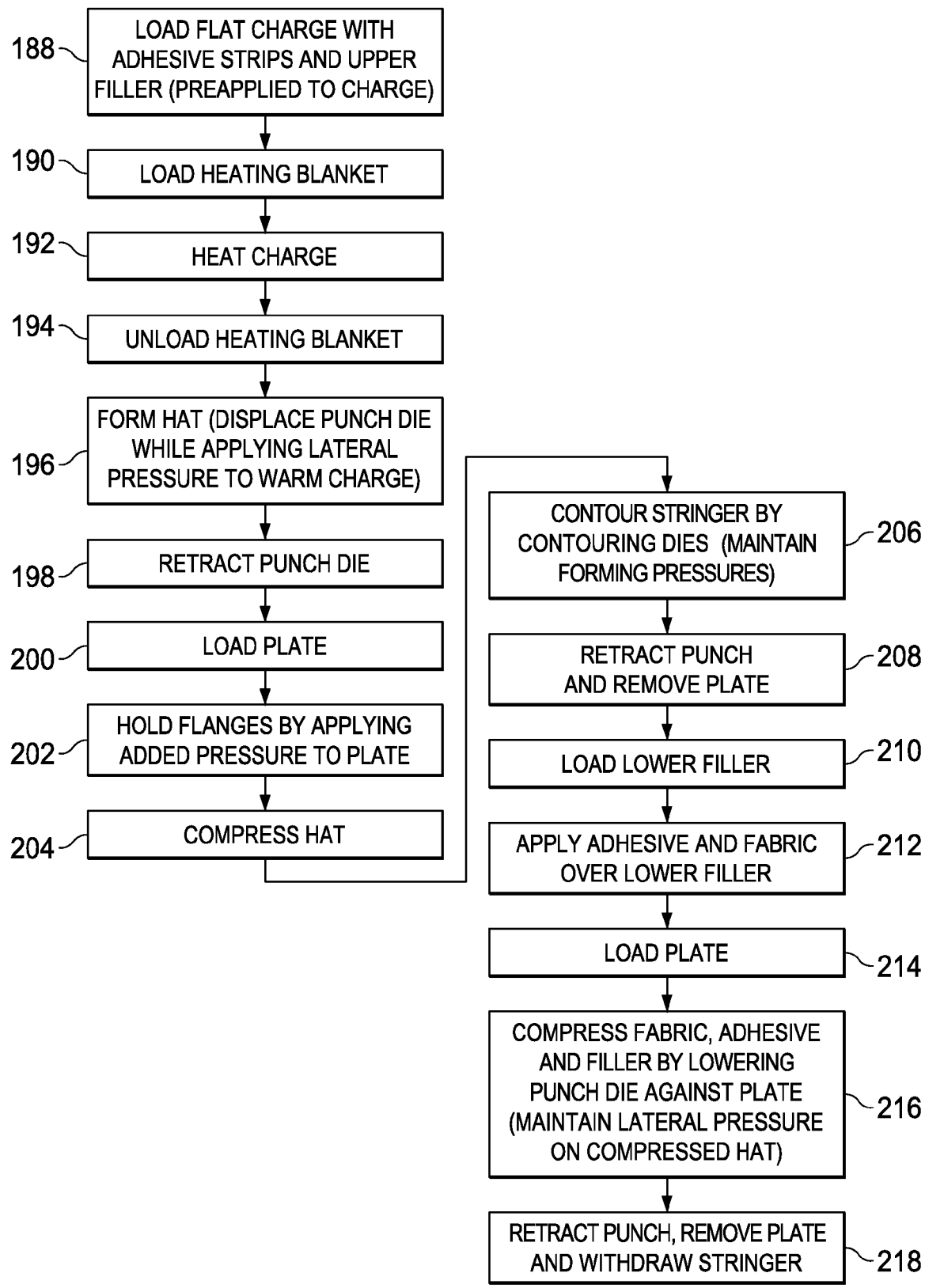
FIG. 26 is an illustration of a flow diagram of a method of fabricating the contoured blade stringer shown in FIG. 3.

Attention is now directed to FIG. 26, along with related FIGS. 27-43 which illustrate steps of a method of fabricating a hybrid type blade stringer 50a, such as that shown in FIG. 3. As can be seen from FIGS. 27-43, the tooling apparatus 68 use to fabricate the stringer 50a shown in FIG. 3 is substantially similar to that previously described, with two exceptions.

Figure 27:
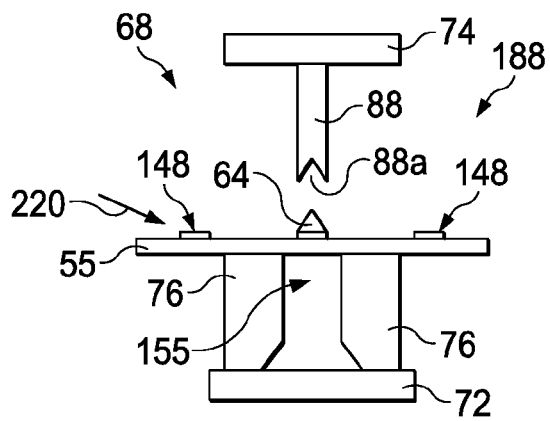
FIGS. 27-43 are diagrammatic illustrations of the tooling apparatus shown in FIG. 4, respectively showing the sequential steps of the fabrication method shown in FIG. 26.
Figure 28:
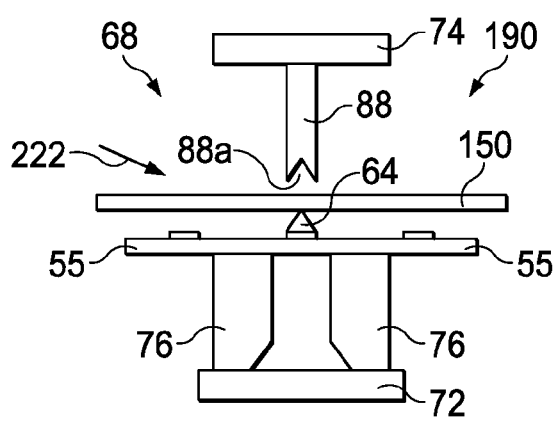
Figure 29:
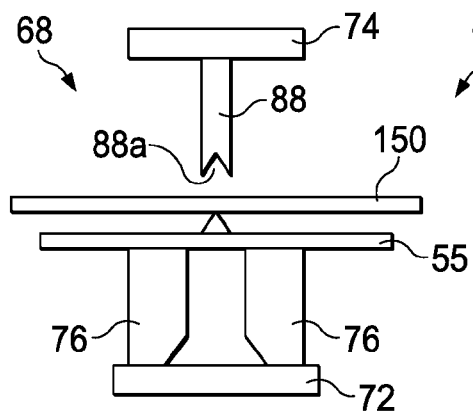

Specifically, as shown in FIG. 27, the end of the punch 88 includes a generally V-shaped groove 88a along the length of the punch 88 which substantially matches the size and shape of a triangular filler 64. Additionally, each of the die blocks 78 includes a bevel or chamfer 155 along a bottom edge which assists in forming the angularly shaped outer end 62 of the blade 52 shown in FIG. 3.

Figure 30:
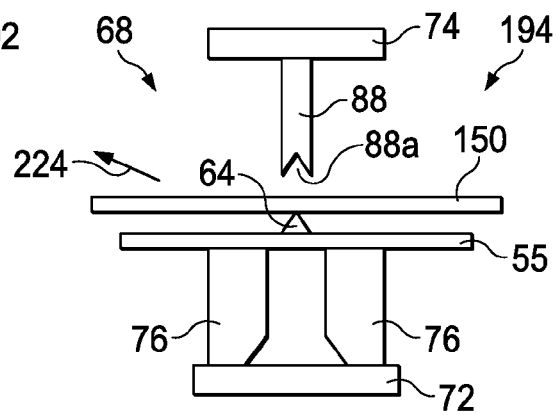
Figure 31:
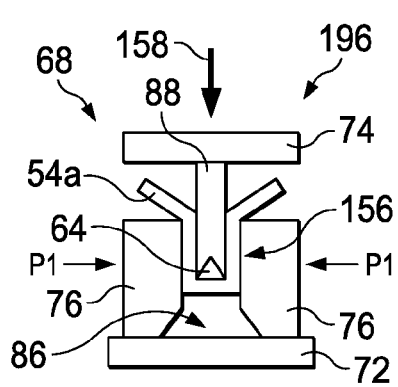
Figure 32:
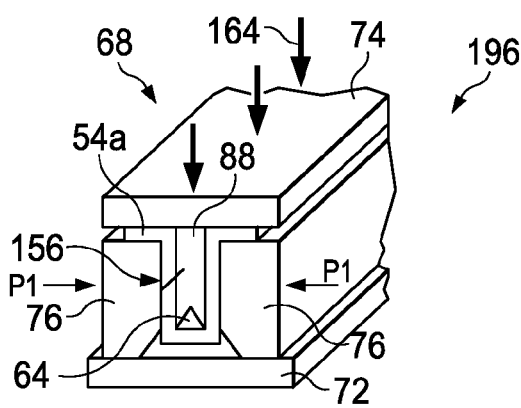
Figure 33:
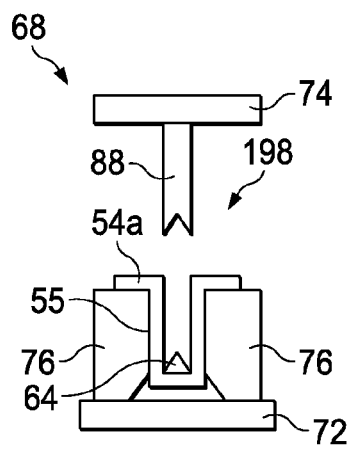
Figure 34:
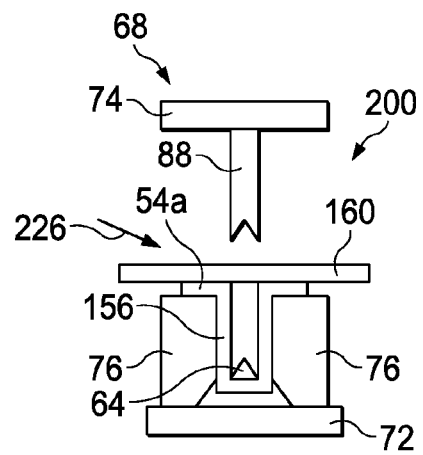
Figure 35:
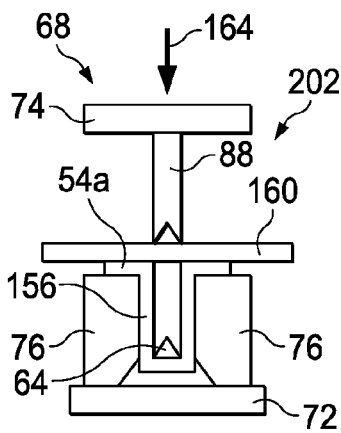
Figure 36:
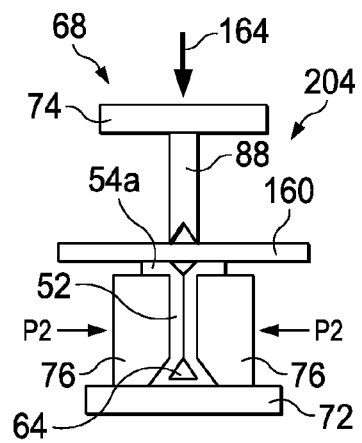

Referring now to FIG. 26, at step 188 a substantially flat composite charge 55 (FIG. 27) is loaded 220 onto the die blocks 76. Strips of adhesive 148 may be applied to the charge 55, following which the upper filler 64 is placed over the central adhesive strip 148. Next, at 190, a heating blanket 150 (FIG. 28) is loaded 222 onto the charge 55. At step 192 in FIG. 26, the blanket 150 is used to heat the charge 55 (FIG. 29) to a suitable forming temperature. At step 194 in FIG. 26 the blanket 150 is unloaded 224, as shown in FIG. 30. At step 196 the punch 88 is displaced downwardly into the die cavity 86 (FIG. 31) to form the charge 55 into a hat 156. As the punch 88 continues to move downwardly through the cavity 86, the upper plate 74 comes into contact with the flange portions 54a, and forms the latter down against the die blocks 76. During step 196, lateral pressure P1 is applied to the die blocks 76 by the inflatable hoses 82 (see FIGS. 4 and 5).

At step 198, the punch 88 is retracted (FIG. 33) and at step 200, a substantially flat plate 160 (FIG. 34) is loaded 226 onto the flange portions 54a of the partially formed charge 55. At step 202, the punch 88 is loaded against the plate 66 (FIG. 35) which applies pressure to the flange portions 54a to hold them against the die blocks 76. At 204, lateral pressure P2 is applied (FIG. 36) by the hoses 82 to the die blocks 76, causing the die blocks 76 to compress the hat 156 (FIG. 35) into a blade 52.

Figure 37:
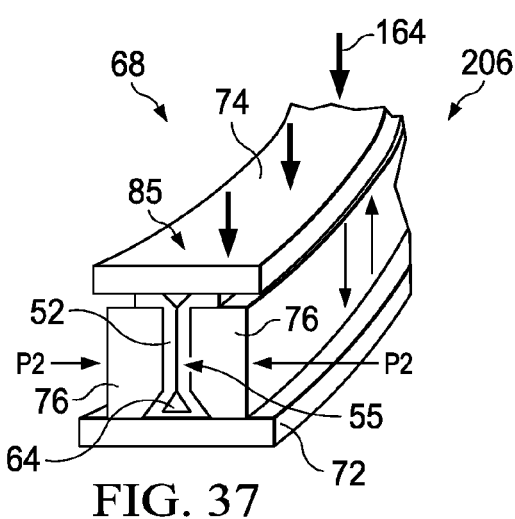
Figure 38:
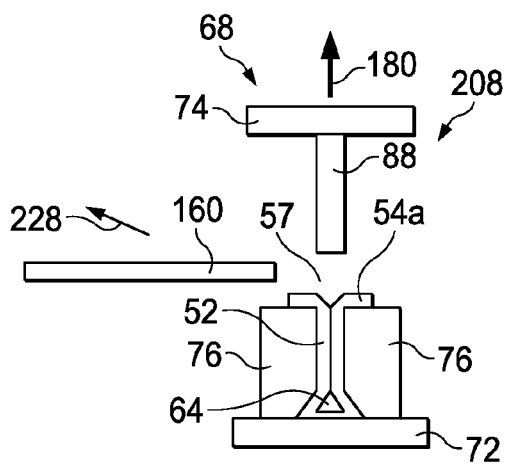
Figure 39:
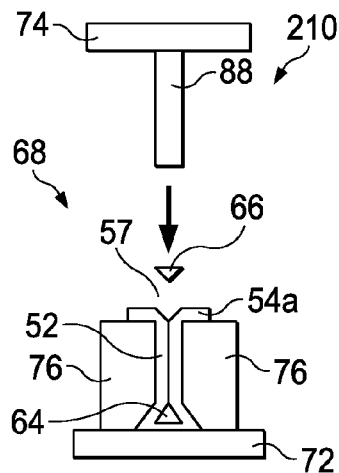
Figure 40:
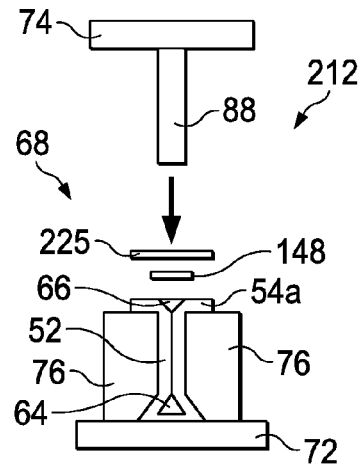

Next, at step 206 and as shown in FIG. 37, the punch 88 is removed the plate 74 and formed stringer 52 may be optionally contoured 85 by contouring the tooling apparatus 68 using a press such as that shown in FIG. 7 which applies a force 164 to the plates 72, 74 to bend the plates 72 74 to the desired contour. During the contouring 85 of the tooling apparatus 68 in step 206, lateral inward pressure P2 is maintained on the die blocks 76 by the hoses 82.

Figure 41:
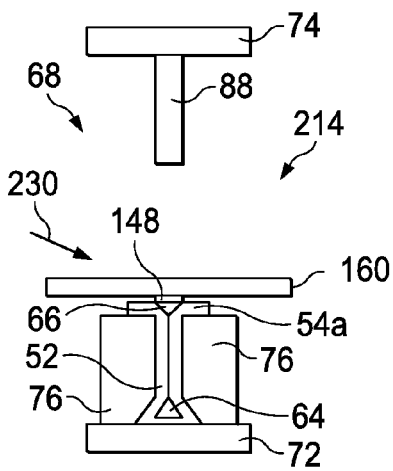
Figure 42:
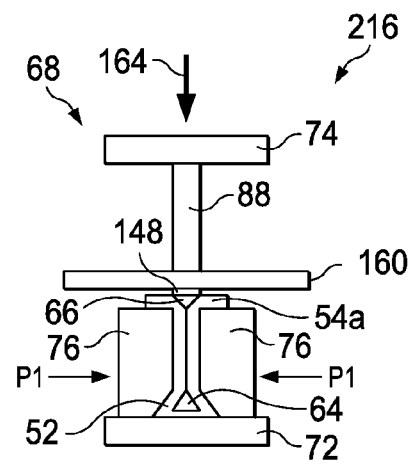
Figure 43:
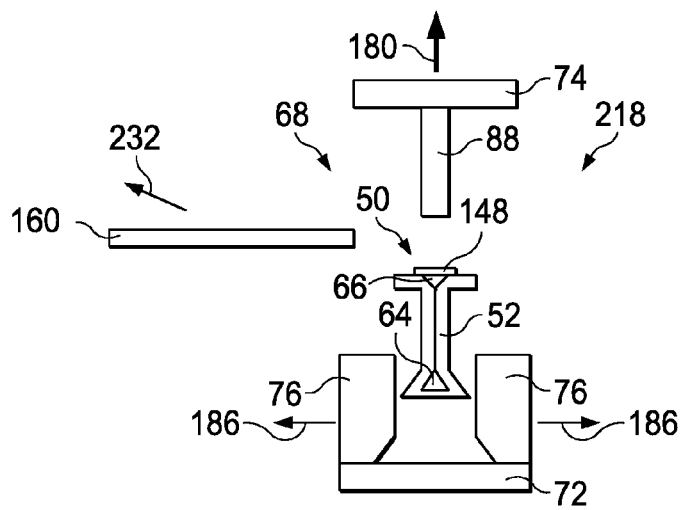

Following contouring of the stringer 52 at step 206, the punch 88 is retracted 180 as shown at 208, and the plate 160 is removed 228. At step 210 in FIG. 26, a lower filler 66 (FIG. 39) is loaded into the groove 165 between the flange portions 54a. Next, as shown in step 212 in FIG. 26, a strip of adhesive 148 and a layer of fabric 225 is placed over the filler 66 (see FIG. 30). As shown in step 214 in FIG. 26, the plate 160 is reloaded 230 onto the flange portions 54a (FIG. 41). At 216, the punch 88 is displaced downwardly into contact with the plate 160 which compresses the fabric layer 225 and adhesive 148 against the filler 66. During step 216, pressure P1 is maintained on the die blocks 76. Finally, at step 218 in FIG. 26, the punch 88 is retracted 180 (FIG. 43), the plate 160 is removed 232 and the completed stringer 52 is withdrawn from the tooling apparatus 68.

As previously mentioned, contouring of the tooling apparatus 68 is optional when carrying out the method shown in FIGS. 26-43, and is not required when using the tooling apparatus 68 to form substantially straight stringers (not shown) having the hybrid-I shape shown in FIG. 3. When stringer contouring is not required, it is not necessary to perform steps 198-206. In the embodiment described in connection with FIGS. 27-43, contouring of the blade portion 52 is performed after the flange portions 54a have been formed. Alternately, however, it may be preferable in other embodiments to form the flange portions 54a after the blade portions 52 have been formed, following which the upper filler 66 may be installed. By contouring the charge 55 before the flange portions 54a have been formed, the contouring process may be easier and/or part quality may be improved.

Figure 44:
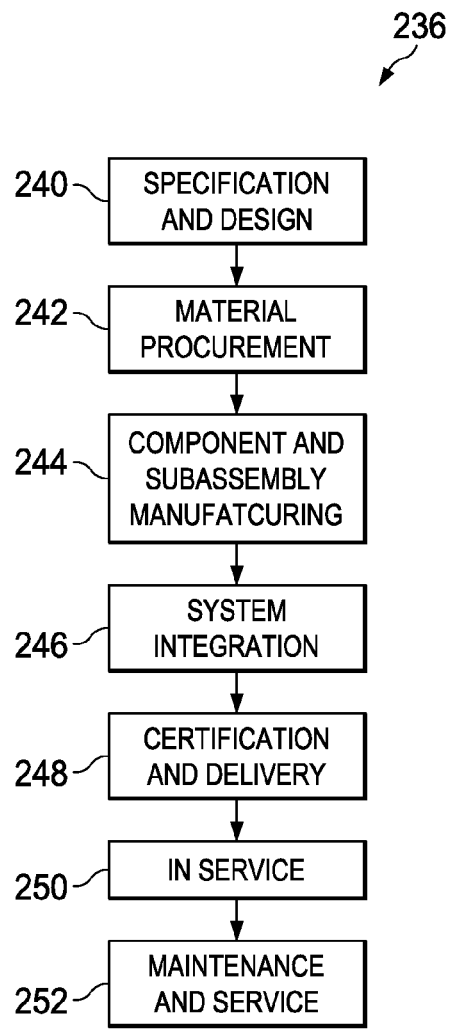
FIG. 44 is an illustration of a flow diagram of aircraft production and service methodology.
Figure 45:
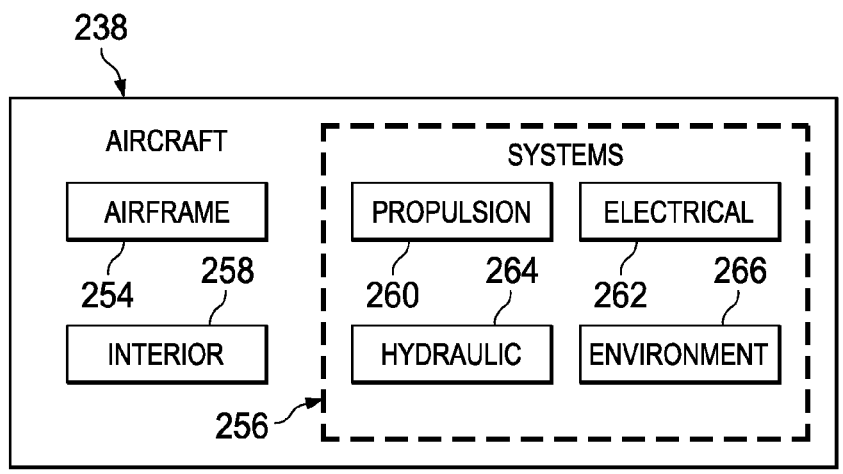
FIG. 45 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 44 and 45, embodiments of the disclosure may be used in the context of an aircraft manufacturing and service method 236 as shown in FIG. 44 and an aircraft 238 as shown in FIG. 45. Aircraft applications of the disclosed embodiments may include, for example, without limitation, layup of stiffener members such as, without limitation spars and stringers. During pre-production, exemplary method 236 may include specification and design 240 of the aircraft 238 and material procurement 242. During production, component and subassembly manufacturing 244 and system integration 246 of the aircraft 238 takes place. Thereafter, the aircraft 238 may go through certification and delivery 248 in order to be placed in service 250. While in service by a customer, the aircraft 238 is scheduled for routine maintenance and service 250, which may also include modification, reconfiguration, refurbishment, and so on.

Each of the processes of method 236 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 45, the aircraft 238 produced by exemplary method 236 may include an airframe 254 with a plurality of systems 256 and an interior 258. Examples of high-level systems 256 include one or more of a propulsion system 260, an electrical system 262, a hydraulic system 264, and an environmental system 266. Any number of other systems may be included. Although an aerospace example is shown, the principles of the disclosure may be applied to other industries, such as the marine and automotive industries.

Systems and methods embodied herein may be employed during any one or more of the stages of the production and service method 236. For example, components or subassemblies corresponding to production process 244 may be fabricated or manufactured in a manner similar to components or subassemblies produced while the aircraft 238 is in service. Also, one or more apparatus embodiments, method embodiments, or a combination thereof may be utilized during the production stages 244 and 246, for example, by substantially expediting assembly of or reducing the cost of an aircraft 238. Similarly, one or more of apparatus embodiments, method embodiments, or a combination thereof may be utilized while the aircraft 238 is in service, for example and without limitation, to maintenance and service 252.

Figure 46:
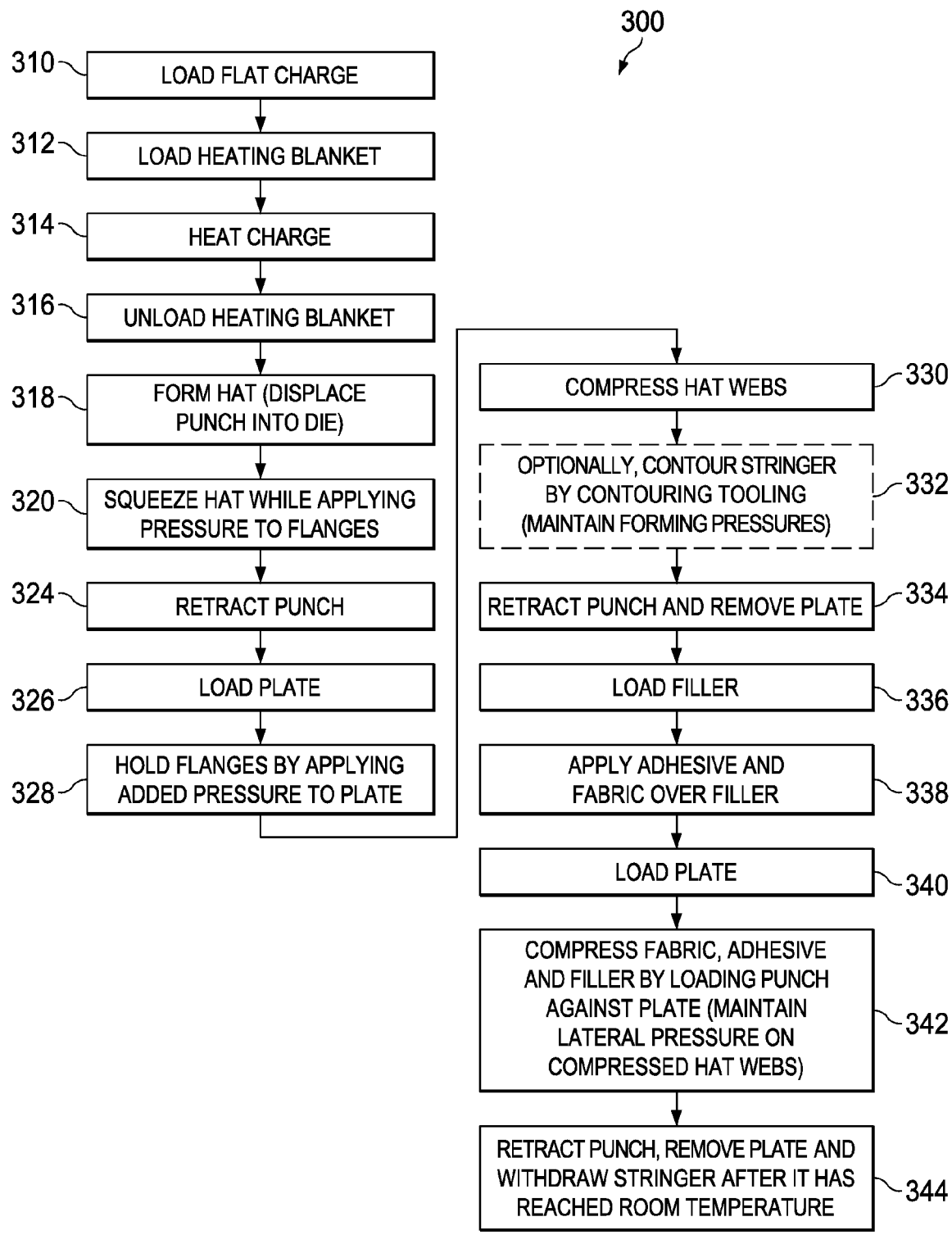
FIG. 46 is a flowchart of a method for fabricating the contoured blade stringer shown in FIGS. 1 and 2, according to an advantageous embodiment.

Attention is now directed to FIG. 46. FIG. 46 is a flowchart of a method for fabricating the contoured blade stringer shown in FIGS. 1 and 2, according to an advantageous embodiment. Thus, FIG. 46 describes a method of fabricating contoured blade stringers. These steps are also sequentially shown, in diagrammatic form, in FIGS. 9-25. Method 300 further includes additional material.

Figure 9:
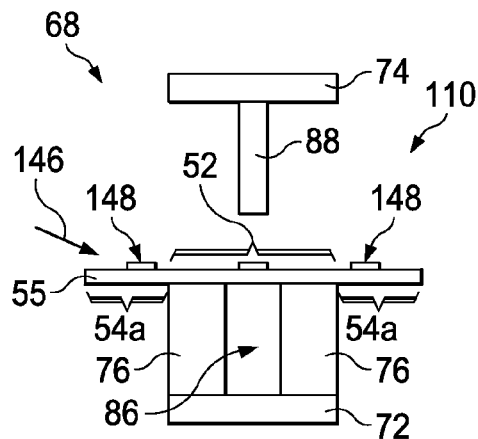
FIGS. 9-25 are diagrammatic illustrations of the tooling apparatus shown in FIG. 4, respectively showing the sequential steps of the fabrication method shown in FIG. 8.

Method 300 may begin with loading a flat charge (operation 310). For example, a substantially flat, multi-ply composite charge 55 is loaded 146 onto the die blocks 76, as shown in FIG. 9, with punch 88 in a raised position. A central blade portion 52 of charge 55 may overlie die cavity 86, and the outer flange portions 54a of charge 55 may extend laterally beyond die blocks 76. Strips of adhesive 148 may be placed on charge 55, either before or after charge 55 is loaded onto die blocks 76.

Next, a heating blanket is loaded (operation 312). For example, heating blanket 150 of FIG. 10 may be loaded 152 onto charge 55.

Next, the charge is heated (operation 314). For example, charge 55 of FIG. 11 may be heated using heating blanket 150, thereby softening charge 55 to a suitable forming temperature. Other types of heating devices may be used to heat charge 55, including but not limited to radiant and inductive type heaters (not shown).

Next, the heating blanket is unloaded (operation 316). For example, heating blanket 150 of FIG. 12 may be unloaded at 154.

Then, the hat is formed and the punch is displaced into the die (operation 318). For instance, blade portion 52 of charge 55 may be formed into hat 156 of FIG. 13 by forcing 158 punch 88 into die cavity 86. As hat 156 is being formed, a first intermediate level of pressure P1 is applied to die blocks 76 by hoses 82 in order to maintain die blocks 76 loaded against charge 55. However this intermediate level of pressure P1 is less than the laterally outward pressure developed by punch 88, consequentially although loaded against hat 156, die blocks 76 may move laterally outward 168 until hat section 156 is fully formed within die cavity 86.

Figure 14:
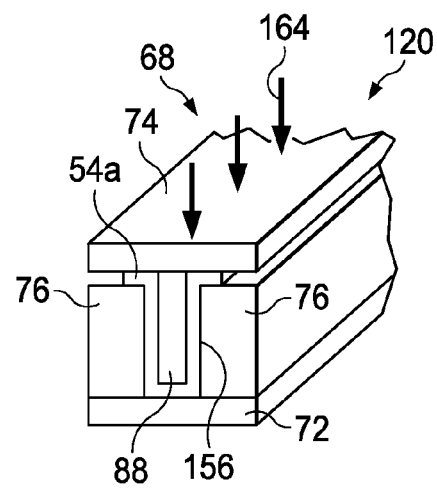

Next, the hat is squeezed while pressure is applied to the flanges (operation 320). For example, while laterally inward pressure P1 of FIG. 14 is maintained against hat 156 by die blocks 76, the top plate 74 may apply pressure 164 to flange portions 54a, forming flange portions 54a against the die blocks 76.

Next, the punch is retracted (operation 324). For example, punch 88 may be retracted from the die cavity 86 of FIG. 16.

Next, the plate is loaded (operation 326). For example, substantially flat plate 160 of FIG. 17 may be loaded 162 onto the flange portions 54a.

Then the flanges are held by applying added pressure to the plate (operation 328). For example, punch 88 of FIG. 18 may be lowered 158 into contact with plate 160, thereby loading plate 160 against flange portions 54a and consequently immobilizing flange portions 54a.

Next, the hat webs are compressed (operation 330). For example, while the flange portions 54a of FIG. 19 are held in place against the die blocks 76 by the force applied by plate 160 and punch 88, pressure P2 may be applied to die blocks 76 by hoses 82 which squeeze hat 156 into a blade 52. The pressure P2 is a forming pressure that is greater than pressure P1 applied to die blocks 76 during operations 318-320, and optionally, operation 332.

Next, optionally, contour stringer by contouring tooling and maintain forming pressures (operation 332). For instance, partially formed charge 55 of FIG. 15 may be contoured by contouring 85 the tooling apparatus 68 while laterally inward pressure P1 continues to be maintained on hat 156 by die blocks 76. Contouring 85 of tooling apparatus 68 may be performed by the press shown in FIG. 7 previously described which bends plates 72, 74 in a plane (not shown) that is substantially parallel to the plane 56 of the flange 54 (see FIGS. 1 and 2). As plates 72, 74 are bent into a desired curvature, both punch 88 and die 78 flex and conform to the curvature of plates 72, 74. As previously described in connection with FIGS. 4-6, the upper and lower shims 80 and 94 may maintain substantially constant forming pressure on flange portions 54a as tooling apparatus 68 is being contoured 85 to the desired shape.

Next, the punch is retracted and the plate removed (operation 334). For example, punch 88 of FIG. 20 may be retracted 180, and plate 160 removed 167 leaving a V-shaped groove 165 between flange portions 54a.

Next, filler is loaded (operation 336). For instance, composite filler 66 of FIG. 21 may be placed in groove 165.

Then, adhesive and fabric is applied over filler (operation 338). For example, strip of adhesive 174 and layer of fabric 172 may be placed over filler 66 of FIG. 22.

Next, the plate is loaded (operation 340). For instance, plate 160 may be reloaded in FIG. 23, overlying flange 54.

Next, the fabric, adhesive, and filler is compressed by loading the punch against the plate and maintaining lateral pressure on the compressed hat webs (operation 342). For example, fabric layer 172, adhesive strip 174, and filler 66 may be compressed in FIG. 24 by displacing the punch downwardly into contact with plate 160.

Finally, the punch is retracted, the plate is removed, and stringer withdrawn after it has reached room temperature (operation 344). For example, punch 88 of FIG. 25 may be retracted 180 and plate 160 may be removed 184, allowing the fully formed blade stringer 50 to be withdrawn from tooling apparatus 68 after it has reached room temperature.

Allowing the stringer 50 to cool down to room temperature while being constrained, before withdrawing the stringer 50 from the tooling apparatus 68, is important because this eliminates the formation of horizontal wrinkles for contoured stringers. By not performing this step, horizontal wrinkles may form in the web for contoured stringers. As used by those of ordinary skill in the art, and as used in the description herein, "a web" refers to the blade portion of the stringer. The blade of a stringer generally includes two flanges and a web, with the web being the portion of the blade that is basically vertical and the flanges resting on the skin and being basically horizontal.

Method 300, described above in detail, involves contouring of the tooling apparatus 68 when the charge 55 is in a partially formed state as shown in FIG. 15. Alternatively, however, the charge 55 may be contoured such as, for example, at operation 332 of method 300, after hat 156 of FIG. 19 has been compressed into blade 52. Contouring of the tooling apparatus 68 is optional and not be required when using tooling apparatus 68 to form substantially straight stringers (not shown). When stringer contouring is not required, it may not be necessary to perform all the steps of method 300.

In either case, the disclosed method may allow ply slippage during the forming and/or contouring processes, which in turn may reduce ply wrinkling and result in finished parts that have superior characteristics and/or exhibit improved performance. Furthermore, in another embodiment, contouring of charge 55 along its length is performed after blade portion 52 is formed, but prior to forming the flange portions 54*a* onto the die blocks 76. The filler 66 is placed in the groove 165 after the flange portions 54*a* have been formed on the contoured blade portion 52. This latter mentioned method embodiment may facilitate the contouring process, particularly where more highly contoured stringers 50 are being fabricated, resulting in improved part quality with less wrinkling and/or easier contouring of the charge 55.

Figure 47:
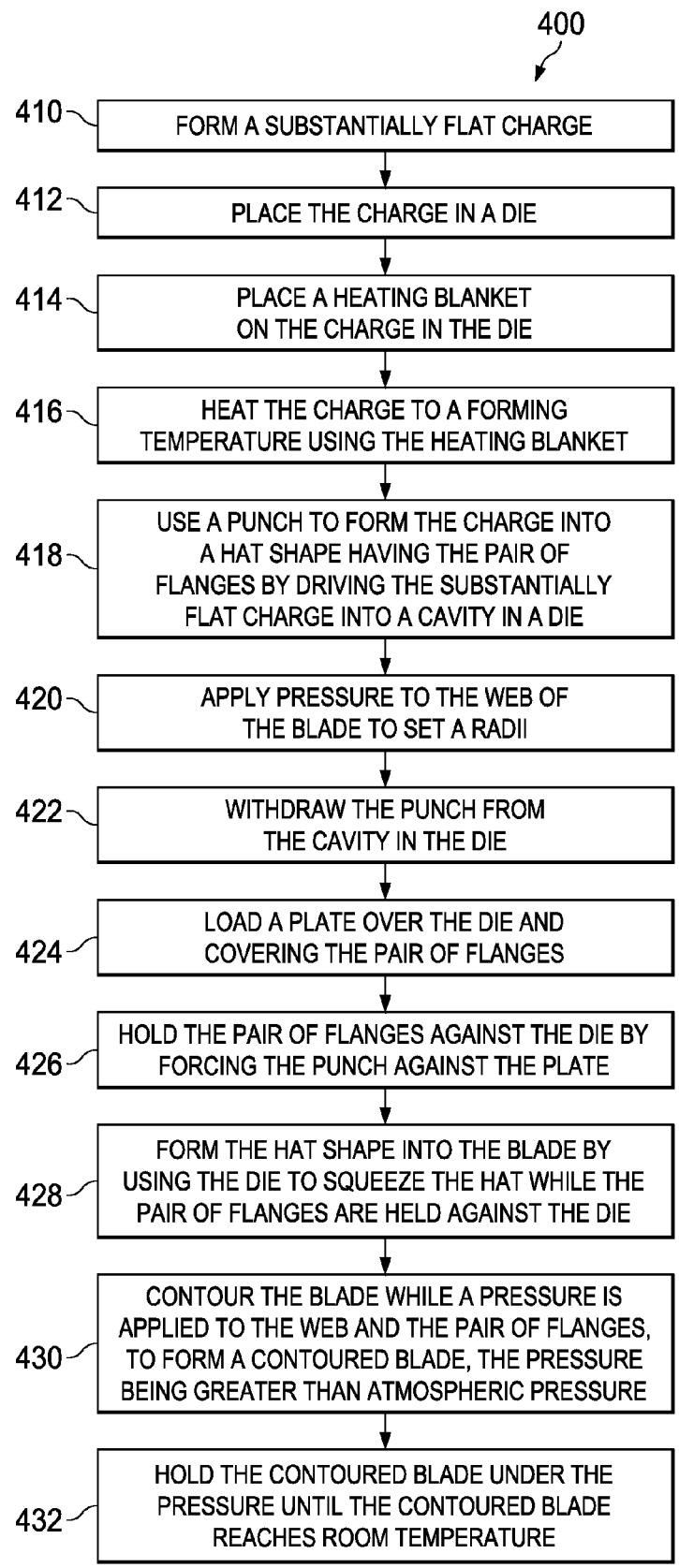
FIG. 47 is a flowchart of a method for fabricating a composite blade stiffener shown in FIGS. 1 and 2, according to an advantageous embodiment.

Attention is now directed to FIG. 47. FIG. 47 is a flowchart of a method of fabricating a composite blade stiffener shown in FIGS. 1 and 2, according to an advantageous embodiment. Thus, FIG. 47 describes a method of fabricating a composite blade stiffener. These steps are also sequentially shown, in diagrammatic form, in FIGS. 9-25. Method 400 further includes additional material.

Method 400 may begin with substantially flat charge being formed (operation 410); followed by the charge being placed in a die (operation 412). Next, a heating blanket may be placed on the charge in the die (operation 414).

The charge may then be heated to a forming temperature using the heating blanket (operation 416). Next, a punch is used to form the charge into a hat shape having the pair of flanges by driving the substantially flat charge into a cavity in a die (operation 418).

Next, pressure is applied to the web of the blade to set a radii (operation 420). For example, the web may be a first portion of the blade which is about vertical relative to the pair of flanges, which are about horizontal to the web of the blade.

Next, the punch is withdrawn from the cavity in the die (operation 422). Then the plate is loaded over the die and the pair of flanges is covered (operation 424). Next, the pair of flanges is held against the die by forcing the punch against the plate (operation 426).

Next, the hat shape is formed into the blade by using the die to squeeze the hat while the pair of flanges is held against the die (operation 428). Then, the blade is contoured while a pressure is applied to the web and the pair of flanges, to form a contoured blade, the pressure being greater than atmospheric pressure (operation 430). Finally, the contoured blade is held under the pressure until the contoured blade reaches room temperature (operation 432).

Figure 48B:
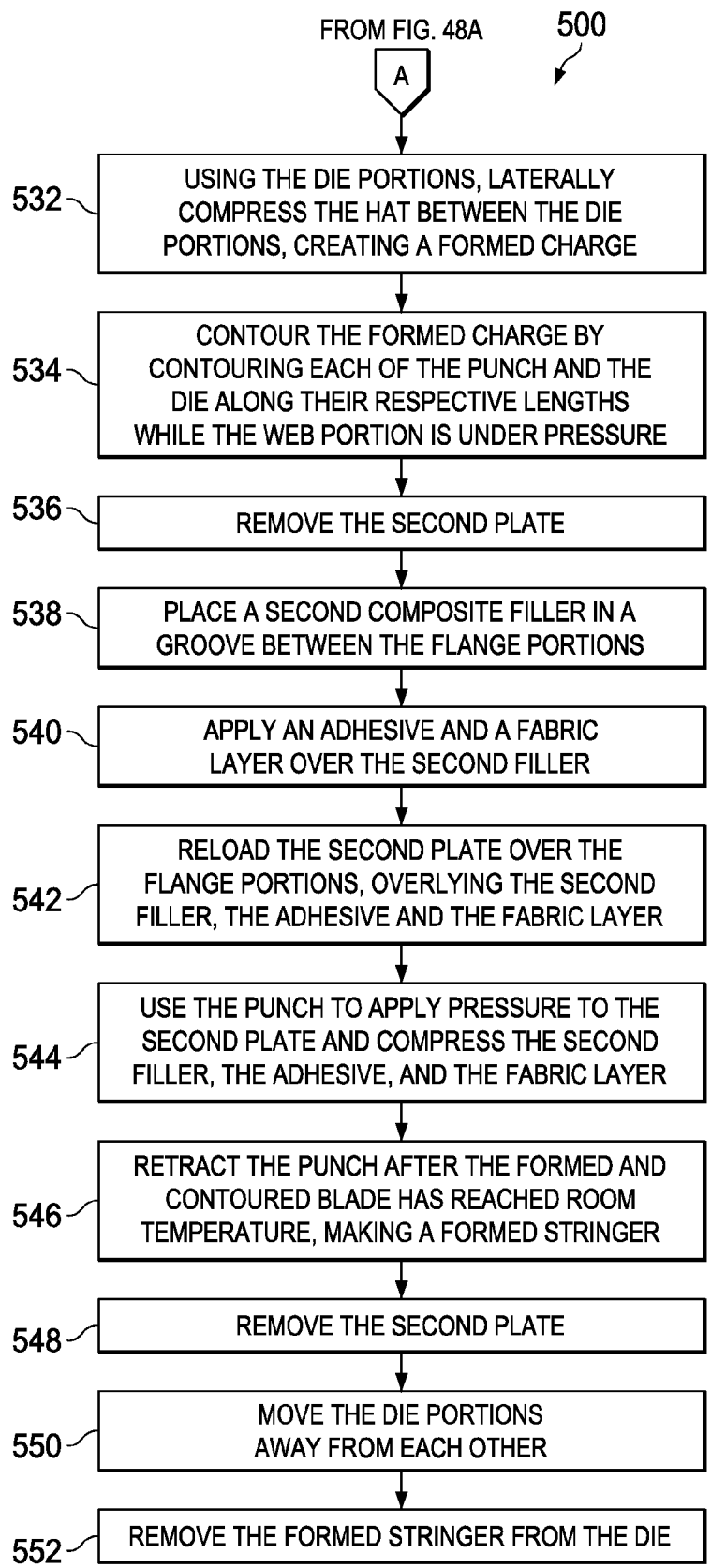

Attention is now directed to FIGS. 48A-48B. FIGS. 48A-48B are a flowchart of a method for fabricating a composite blade stiffener shown in FIGS. 1 and 3, according to an advantageous embodiment. Thus, FIGS. 48A-48B describe a method of fabricating a composite blade stiffener. These steps are also sequentially shown, in diagrammatic form, in FIGS. 9-25. Method 500 further includes additional material.

Method 500 may begin with a substantially flat, multi-ply composite prepreg charge being provided (operation 510). Then, a first filler is placed on the charge (operation 512).

Next, the charge is placed on a die having two opposite die portions and a die cavity between the two opposite die portions (operation 514). Then, the charge is heated to a forming temperature (operation 516). Next, using a punch to drive a first portion of the charge and the first filler into the die cavity, a web portion is formed into a hat (operation 518).

Next, a first plate is used to compress second portions of the charge against the die to form flange portions of the stringer as the hat is being formed by the punch (operation 520). Then, pressure is applied to the web portion after the punch is fully engaged (operation 522).

Next, the pressure to the web portion is released and the punch is retracted from the die cavity (operation 524). Then, a second plate is loaded over the flange portions of the stringer (operation 526).

Next, the flange portions are held against the die by using the punch to apply pressure to the second plate (operation 528). Then, a pair of pressurized hoses is used to respectively apply lateral pressure to the die portions (operation 530).

Next, the die portions are used to laterally compress the hat between the die portions, creating a formed charge (operation 532). Then, the formed charge is contoured by contouring each of the punch and the die along their respective lengths while the web portion is under pressure (operation 534).

Next, the second plate is removed (operation 536). Then, a second composite filler is placed in a groove between the flange portions (operation 538).

Then, an adhesive and a fabric layer are applied over the second filler (operation 540). Next, the second plate is reloaded over the flange portions, overlying the second filler, the adhesive, and the fabric layer (operation 542). Then, pressure is applied to the second plate and the punch is used to compress the second filler, the adhesive, and the fabric layer (operation 544).

Next, the punch is retracted after the formed and contoured blade has reached room temperature, making a formed stringer (operation 546). Finally, the second plate is removed (operation 548); the die portions are then moved away from each other (operation 550); and the formed stringer is removed from the die (operation 552).

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a composite blade stiffener, the blade having a web and a pair of flanges, comprising:
   forming a substantially flat charge;
   placing the charge in a die;
   placing a heating blanket on the charge in the die;
   heating the charge to a forming temperature using the heating blanket;

using a punch to form the charge into a hat shape having the pair of flanges by driving the substantially flat charge into a cavity in a die;

applying pressure to the web of the blade to set a radii, the web being a first portion of the blade which is about vertical relative to the pair of flanges, which are about horizontal to the web of the blade;

withdrawing the punch from the cavity in the die;

loading a plate over the die and covering the pair of flanges;

holding the pair of flanges against the die by forcing the punch against the plate;

forming the hat shape into the blade by using the die to squeeze the hat while the pair of flanges are held against the die;

contouring the blade while a pressure is applied to the web and the pair of flanges, to form a contoured blade, the pressure being greater than atmospheric pressure; and holding the contoured blade under the pressure until the contoured blade reaches room temperature.

2. The method of claim 1, further comprising:

contouring the charge along a length of the charge by contouring the die and the punch before the blade is formed.

3. The method of claim 1, further comprising:

contouring the charge along a length of the charge by contouring the die and the punch after the blade is formed.

4. The method of claim 1, further comprising:

placing a filler between the pair of flanges after the blade has been formed;

reloading the plate over the pair of flanges and the filler; and compressing the filler by driving the punch down against the plate then holding the blade under pressure until it has reached room temperature.

* * * * *